US008725188B1

(12) United States Patent
Murphy et al.

(10) Patent No.: US 8,725,188 B1
(45) Date of Patent: May 13, 2014

(54) ENCLOSED SPACE COMMUNICATION SYSTEMS AND RELATED METHODS

(75) Inventors: Patrick A. Murphy, Phoenix, AZ (US); Matthew J. Savoca, Peoria, AZ (US); Geoffrey D. Simms, Phoenix, AZ (US)

(73) Assignee: Kutta Technologies, Inc., Phoenix, AZ (US)

( * ) Notice: Subject to any disclaimer, the term of this patent is extended or adjusted under 35 U.S.C. 154(b) by 1027 days.

(21) Appl. No.: 12/540,835

(22) Filed: Aug. 13, 2009

Related U.S. Application Data

(63) Continuation-in-part of application No. 12/177,063, filed on Jul. 21, 2008.

(60) Provisional application No. 61/088,409, filed on Aug. 13, 2008, provisional application No. 60/951,027, filed on Jul. 20, 2007.

(51) Int. Cl.
*H04B 7/00* (2006.01)

(52) U.S. Cl.
USPC ....... 455/517; 455/7; 455/8; 455/9; 455/11.1; 455/25; 370/315; 370/316; 370/318; 370/319; 370/320

(58) Field of Classification Search
USPC ............ 455/7–25, 118, 131, 190.1, 313, 314, 455/323; 370/315, 318, 320
See application file for complete search history.

(56) References Cited

U.S. PATENT DOCUMENTS

| | | |
|---|---|---|
| 2,863,147 A | 12/1958 | Berlin |
| 3,440,542 A | 4/1969 | Gautney |
| 3,683,389 A | 8/1972 | Hollis |
| 3,721,989 A | 3/1973 | Christensen |
| 3,750,020 A | 7/1973 | Baba et al. |
| 4,012,662 A | 3/1977 | Martin |
| 4,144,496 A | 3/1979 | Cunningham et al. |
| 4,155,091 A | 5/1979 | Vorie |
| 4,443,802 A | 4/1984 | Mayes |
| RE32,563 E | 12/1987 | Stolarczyk |
| 4,777,652 A * | 10/1988 | Stolarczyk ............... 455/3.03 |
| 4,879,755 A | 11/1989 | Stolarczyk et al. |

(Continued)

FOREIGN PATENT DOCUMENTS

| | | |
|---|---|---|
| DE | 19718423 | 11/1998 |
| EP | 1056039 | 11/2000 |
| EP | 1313169 | 5/2003 |
| EP | 1317016 | 6/2003 |

OTHER PUBLICATIONS

U.S. Office Action dated May 7, 2012 for copending U.S. Appl. No. 12/177,063, 12 pages.

(Continued)

*Primary Examiner* — Fayyaz Alam
(74) *Attorney, Agent, or Firm* — Shannon W. Bates; Klemchuk Kubasta LLP

(57) ABSTRACT

Systems and methods for communication in enclosed areas. Implementations may include a high-frequency (HF) conversion side including an HF modulator and HF demodulator which is coupled with an HF antenna. A medium-frequency (MF) conversion side including an MF modulator and an MF demodulator which is coupled with an MF antenna may also be included. The HF conversion side may be coupled to the MF conversion side at the HF demodulator and the HF modulator. The HF conversion side may be physically separate from the MF conversion side.

13 Claims, 17 Drawing Sheets

(56) References Cited

U.S. PATENT DOCUMENTS

| | | | |
|---|---|---|---|
| 4,972,505 A | 11/1990 | Isberg | |
| 5,087,099 A | 2/1992 | Stolarczyk | |
| 5,093,929 A | 3/1992 | Stolarczyk et al. | |
| 5,146,611 A | 9/1992 | Stolarczyk | |
| 5,230,080 A | 7/1993 | Fabre et al. | |
| 5,345,473 A | 9/1994 | Berg | |
| 5,404,570 A * | 4/1995 | Charas et al. | 455/22 |
| 5,426,439 A | 6/1995 | Grossman | |
| 5,432,838 A | 7/1995 | Purchase et al. | |
| 5,504,809 A | 4/1996 | Chalmers et al. | |
| 5,592,182 A | 1/1997 | Yao et al. | |
| 5,602,556 A | 2/1997 | Bowers | |
| 5,603,080 A * | 2/1997 | Kallander et al. | 455/14 |
| 5,689,804 A | 11/1997 | Sugita et al. | |
| 5,774,789 A | 6/1998 | Van Der Kaay | |
| 5,809,429 A | 9/1998 | Knop et al. | |
| 6,195,561 B1 | 2/2001 | Rose | |
| 6,414,647 B1 | 7/2002 | Lee | |
| 6,636,728 B1 | 10/2003 | Avenel | |
| 6,738,597 B1 * | 5/2004 | Jeung et al. | 455/11.1 |
| 6,810,353 B2 | 10/2004 | Schiffbauer | |
| 6,813,324 B1 | 11/2004 | Yewen | |
| 6,927,698 B2 | 8/2005 | Stolarczyk | |
| 6,963,734 B2 | 11/2005 | Sorrells et al. | |
| 7,043,195 B2 | 5/2006 | Bunton et al. | |
| 7,043,204 B2 | 5/2006 | Reagor et al. | |
| 7,050,831 B2 | 5/2006 | Meiksin et al. | |
| 7,079,081 B2 | 7/2006 | Parsche et al. | |
| 7,149,472 B2 | 12/2006 | Reagor et al. | |
| 7,154,445 B2 | 12/2006 | Littlefield et al. | |
| 7,272,362 B2 * | 9/2007 | Jeong et al. | 455/78 |
| 2002/0163474 A1 | 11/2002 | Ieda | |
| 2004/0185794 A1 * | 9/2004 | Jeong et al. | 455/78 |
| 2006/0012535 A1 | 1/2006 | McLean | |

OTHER PUBLICATIONS

U.S. Office Action dated Jun. 18, 2013 for copending U.S. Appl. No. 12/177,063, 20 pages.

* cited by examiner

ENCLOSED SPACE COMMUNICATION SYSTEMS AND RELATED METHODS

CROSS-REFERENCE TO RELATED APPLICATIONS

This document claims the benefit of the filing date of U.S. Provisional Patent Application No. 61/088,409, entitled "Enclosed Space Communication Systems and Related Methods" to Limbaugh, et al., which was filed on Aug. 13, 2008, the disclosure of which is incorporated entirely herein by reference.

This document is also a continuation-in-part application of the earlier U.S. Utility Patent Application to Limbaugh, et al., entitled "Enclosed Space Communication Systems and Related Methods," application Ser. No. 12/177,063, filed Jul. 21, 2008, which claimed the benefit of U.S. Provisional Patent Application No. 60/951,027, entitled "HF-MF/MF-HF Converters, Emergency Communication Systems, and Methods of Use" to Limbaugh, et al., which was filed on Jul. 20, 2007, the disclosures of which are hereby incorporated entirely herein by reference.

STATEMENT REGARDING FEDERALLY SPONSORED RESEARCH OR DEVELOPMENT

The U.S. Government has a paid-up license in implementations of systems and methods disclosed in this document and the right in limited circumstances to require the patent owner to license others on reasonable terms as provided for by the terms of contract No. W15P7T-06-C-K203 awarded by the United States Army.

BACKGROUND

1. Technical Field

Aspects of this document relate generally to telecommunications systems and methods involving radio frequency electromagnetic signals.

2. Background Art

Telecommunication systems, particularly radio communication systems utilizing radio frequency electromagnetic signals, are used in many applications to allow wireless communication of voice and data over long distances. A large number of techniques are employed in conventional radio communication systems that alter properties of the radio frequency waves used in order to transmit the information, such as amplitude modulation (AM) or frequency modulation (FM). Many radio communication systems are "line-of-sight," meaning that reliable communication can be achieved only when there are no physical barriers such as hills or buildings between the transmitter and the receiver. The radio spectrum used for line-of-sight wireless networking systems is typically between 300 MHz to 5 GHz. Some line-of-sight systems, such as the 802.11a protocol operating at 5 GHz, have some limited ability to penetrate through various solid obstacles such as walls and the roofs of buildings; however, in these situations, the signal strength can vary significantly because of the signal attenuation that occurs through the interaction of the signal and the obstacles.

SUMMARY

Implementations of a system for communicating voice or data information in an enclosed space may include a high-frequency (HF) conversion side including an HF modulator and HF demodulator which is coupled with an HF antenna. A medium-frequency (MF) conversion side including an MF modulator and an MF demodulator which is coupled with an MF antenna may also be included. The HF conversion side may be coupled to the MF conversion side at the HF demodulator and the HF modulator. The HF conversion side may be adapted to receive an HF signal from the HF antenna and produce an HF baseband signal and to receive an MF baseband signal from the MF conversion side and produce an HF signal. The MF conversion side may be adapted to receive and MF signal from the MF antenna and produce the MF baseband signal and to receive the MF baseband signals and produce an MF signal. The HF conversion side may be physically separate from the MF conversion side.

Implementations of the system for communication voice or data information may include one, all, or any of the following:

The HF conversion side may be coupled to the MF conversion side through one or more cables.

The HF conversion side may be acoustically coupled to the MF conversion side.

The HF conversion side may be included in an HF radio included in an enclosure where a push-to-talk button on the HF radio is pressed by an actuator within the enclosure in response to an HF control logic signal received by the HF side from the MF conversion side.

The HF conversion side and the MF conversion side may be included in a single enclosure.

The HF conversion side may be included in a first enclosure and the MF conversion side may be included in a second enclosure.

The MF modulator and the MF demodulator may be physically separate and may be included in an MF modulator enclosure and in an MF demodulator enclosure, respectively.

The MF modulator and the MF demodulator may be coupled through a cable.

The MF modulator and the MF demodulator may be coupled through a first MF antenna coupled to the MF modulator and through a second MF antenna coupled to the MF demodulator.

Implementations of a second implementation of a system for communicating voice or data information in an enclosed space may include an HF unit including an HF modulator, an HF demodulator, and an HF sense controller, where the HF unit is coupled with an HF antenna. An MF unit may be included that includes an MF modulator, an MF demodulator, and an MF sense controller, where the MF unit is coupled with an MF antenna. The HF unit may be coupled to the MF conversion side that the HF demodulator, the HF modulator, and the HF sense controller. The HF unit may be included in a first enclosure and the MF unit may be included in a second enclosure physically separated from the first enclosure and coupled with the MF unit through one or more cables.

Implementations of a second implementation of a system for communicating voice or data information may include one, all, or any of the following:

The HF unit may be an HF radio and the MF unit may be an MF radio.

The HF unit may be adapted to switch from a receive mode to a transmit mode in response to an MF to HF control logic signal. The MF unit may be adapted to switch from a receive mode to a transmit mode in response to an HF to MF control logic signal.

The HF to MF control logic signal may be sent by proxy when an HF baseband signal with an amplitude above a predetermined threshold is detected by the MF modulator.

The HF to MF control logic signal and the MF to HF control logic signal may be send in response to receiving a continuous tone-coded squelch system (CTCSS) tone.

The MF modulator and the MF demodulator may be physically separate and the MF modulator may be included in the second enclosure and the MF demodulator may be included in a third enclosure.

The MF modulator and the MF demodulator may be coupled through a cable.

The MF modulator and the MF demodulator may be coupled through a first MF antenna coupled to the MF modulator and through a second MF antenna coupled to the MF demodulator.

Implementations systems like those disclosed in this document may utilize implementations of a method of switching an MF unit and an HF unit from a transmit mode to a receive mode. The method may include detecting the amplitude of an HF baseband signal with an MF modulator, comparing the detected amplitude of the HF baseband signal with a predetermined threshold using the MF modulator, and, if the detected amplitude is greater than the predetermined threshold, transmitting an MF modulator control signal to an MF sense controller. The method may also include switching an MF unit into transmit mode by enabling an MF modulator and disabling an MF demodulator in response to the MF modulator control signal.

Implementations of the method may include one, all, or any of the following:

The method may include sending an MF to HF control logic signal using the MF sense controller to an HF sense controller in response to receiving an MF demodulator sense signal with the MF sense controller and switching an HF unit into transmit mode by enabling an HF modulator and disabling an HF demodulator in response to the MF to HF control logic signal.

Sending the MF to HF control logic signal may further include sending the MF to HF control logic signal in response to receiving a CTCSS signal with the MF sense controller and sending a push-to-talk signal for the HF unit using the MF sense controller.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
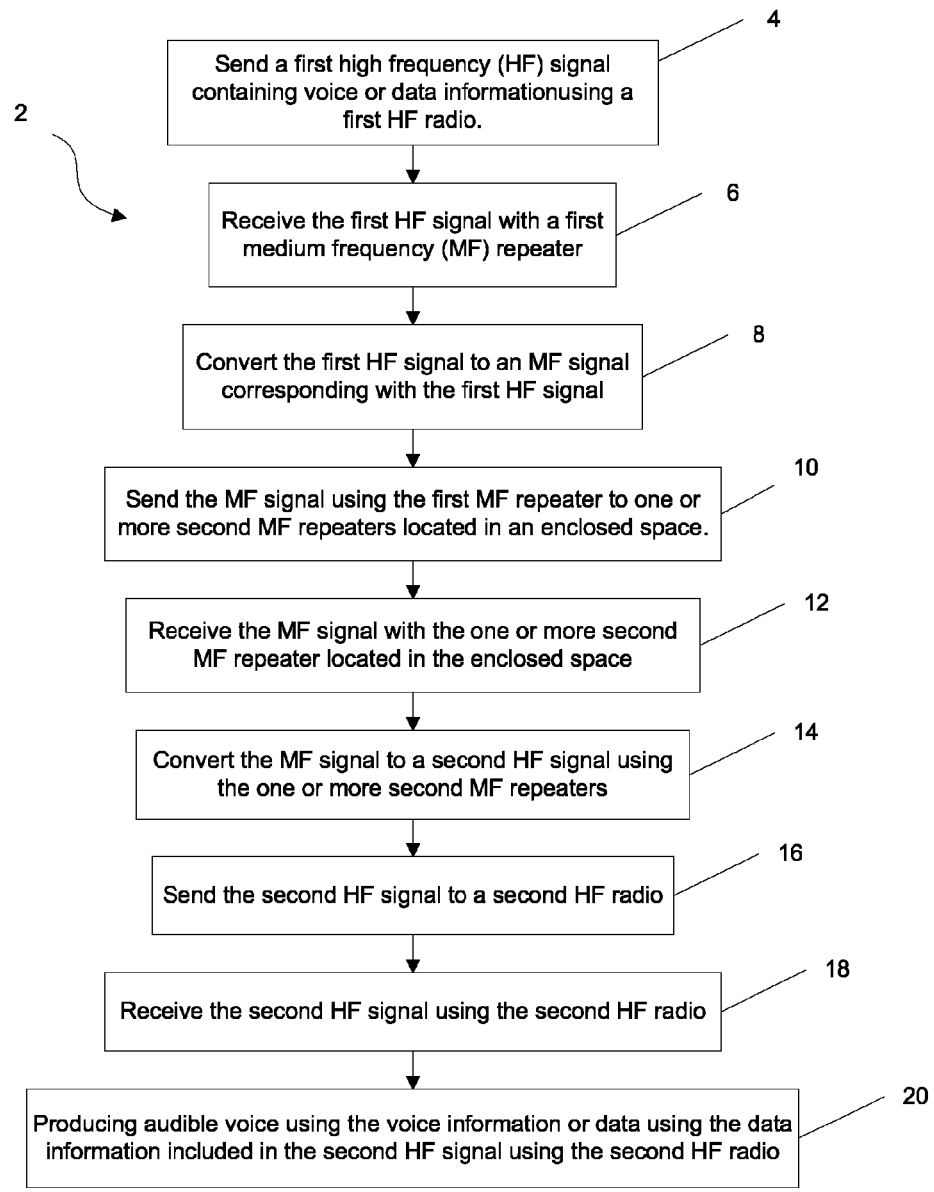
FIG. 1 is a flowchart of an implementation of a method of communicating voice or data information in an enclosed space.

This disclosure, its aspects and implementations, is not limited to the specific components or assembly procedures disclosed herein. Many additional components and assembly procedures known in the art consistent with the intended radio communication systems and enclosed space communications systems and/or assembly procedures for a radio communication system and/or enclosed space communication system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such radio communication systems and enclosed space communication systems and implementing components, consistent with the intended operation.

Radio frequency communication in enclosed areas presents significant challenges. Enclosed areas may include many different use conditions, including, by non-limiting example, buildings, mine passageways and shafts, caves, man-made tunnels, subways, and any other structure or naturally occurring formation tending to inhibit transmission of radio waves. Because of the attenuating effect of solid materials on radio frequency electromagnetic radiation, higher frequency signals are often completely unable to pass through, thus terminating any potential communication between a radio unit inside an enclosed area and one outside. The degree of attenuation by the solid material, however, depends both upon the properties of the material and on the frequency of the radio radiation being used.

For high radio frequencies, such as those conventionally designated as high frequency (HF, 3-30 MHz), very high frequency (VHF, 30-300 MHz), or ultra-high frequency (UHF, 300-3000 MHz), the attenuation by solid materials such as rock is substantial. However, for radio frequencies in the medium frequency (MF, 300-3000 kHz or 0.3-3 MHz) or low frequency (LF, 30-300 kHz) ranges, substantial propagation of the radio waves has been observed, even through solid rock. In this document, the range of frequencies referred to by the abbreviation "HF" is used to refer to all frequencies greater than 3 MHz. The transmission of MF and LF signals is enhanced if metallic structures, such as ore deposits or conductors like wires, cables, rails, power cables, trolley lines, telephone lines, insulated wires, etc., lie along a propagation path. Such behavior is sometimes referred to as parasitic inductive coupling and can be used to link or enhance the link between two radio units. Because of this property of MF and LF signals, any powered or non-powered wire in the enclosed area can be used to propagate a signal.

In mining applications in particular, radio communication systems often involve the use of various HF radios (such as Kenwood® VHF or UHF radios) in combination with "leaky feeder" cable systems. A leaky feeder cable is designed to receive HF signals and transport them while allowing the signals to be rebroadcast along the cable's length. Many different conventional designs exist for leaky feeder cables, an example of which may be found in U.S. Pat. No. 5,465,395 to Bartram entitled "Communication via Leaky Cables," issued Nov. 7, 1995, the disclosure of which is hereby incorporated herein by reference. When leaky feeder cable based communication systems are employed in mining operations, as long as an HF radio (either digital or analog) remains within range of a section of cable, it will remain connected to the system. The effective range of an HF radio in a mining tunnel depends both upon the distance from a leaky feeder cable section and whether the leaky feeder cable section is located around a bend in the tunnel or up a shaft. In an emergency situation, such as a cave in, since the leaky feeder cable is typically located along the top of a tunnel, the cable may be broken. When the leaky feeder cable is severed, HF signals may no longer be able to travel along the severed section of the leaky feeder cable, thus preventing all individuals using HF radios along the severed section from being able to communicate. Because the individuals along the severed section are most often those trapped, the immediate loss of communication adds to the critical nature of the emergency.

This document describes various systems, such as radio communication systems or enclosed space communication systems, along with various methods that are described primarily as utilizing MF radio frequency signals. However, the systems and methods disclosed in this document can also be implemented using LF or other additional frequency bands capable of penetrating through various enclosures. References in this document to HF radiation are equally applicable to VHF and UHF as well since, as was defined previously, the HF abbreviation is used to refer to all frequencies greater than 3 MHz.

The ability of MF signals to propagate through solid media can be utilized in systems employing radio frequency repeaters such as HF to MF (HF-MF) repeaters or MF repeaters as disclosed in this document. Some radio frequency repeaters may perform HF to MF conversions, while other radio frequency repeaters may only receive and transmit MF signals. In implementations performing HF to MF conversion, conventional HF radios are connected with the HF-MF repeaters and the HF signals generated by the HF radios (containing voice or data) are converted to corresponding MF signals and transmitted by the HF-MF repeaters through the boundaries of the enclosure. In particular implementations, various HF-MF repeaters may be connected through the MF signals to form an MF network allowing users of HF radios to communicate with other HF radio users out of ordinary HF signal range. Where the term HF-MF repeater is used in various places in this document, the term MF repeater is also equivalent. In implementations of systems utilizing HF-MF repeaters or radio frequency systems using only MF signals, various implementations of MF handheld radios may be utilized to transmit voice or data information.

Referring to FIG. 1, an implementation of a method of communicating voice or data information in an enclosed space 2 is illustrated. As illustrated, the method 2 includes sending a first HF signal containing voice or data using a first HF radio (step 4), receiving the first HF signal with a first MF repeater (step 6), and converting the first HF signal to an MF signal corresponding with the first HF signal (step 8). The method 2 may also include sending the MF signal using the first MF repeater to one or more second MF repeaters located in an enclosed space (step 10), receiving the MF signal with the one or more second MF repeaters located in the enclosed space (step 12), and converting the MF signal to a second HF signal using the one or more second MF repeaters (step 14). The method 2 may include sending the second HF signal to a second HF radio (step 16), receiving the second HF signal using the second HF radio (step 18), and producing audible voice using voice information or data using data information included in the second HF signal using the second HF radio (step 20). As illustrated, the process of the method 2 involves taking the HF signal from an HF radio, converting it to an MF signal using an MF repeater, sending the MF signal to another MF repeater, and then reconverting it to an HF signal for reception by another HF radio. Any conductor (wire, leaky feeder cable, buried wire, etc.) located along the path of the MF signal between the MF repeaters may also be utilized in particular implementations during the sending and receiving steps of the method to carry the signal.

The process of sending and receiving HF and MF signals in implementations of the method 2 may involve communication on only one channel or a plurality of HF and/or MF channels. For example, the first HF signal and the second HF signal may ultimately be transmitted using the same HF channel. In other implementations, however, the HF channels may be different, or the signal may be broadcast in succession across a subset of, or all possible HF channels for frequency band segments. Transmission using a single HF channel may be utilized in conventional or in emergency operations, where a single channel is reserved for emergency use only. In other implementations, emergency procedures may require transmission across all channels in succession to alert everyone possible. In addition, the HF and/or MF signals may be transmitted by the MF repeaters and/or an MF network including two or more MF repeaters by means of broadcast, multicast, anycast, or unicast methods. Many potential channel configurations are possible when utilizing various implementations of the radio communication systems disclosed in this document.

Figure 2A:
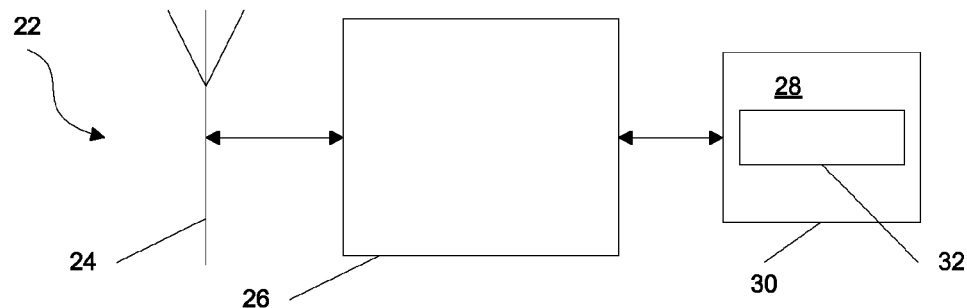
FIG. 2A is a block diagram of a first implementation of a radio communication system.

Referring to FIG. 2A, a first implementation of a radio communication system 22 is illustrated. As illustrated, the radio communication system 22 includes an HF antenna 24 coupled to an HF-MF analog converter module 26. The HF-MF analog converter module 26 is coupled in turn with an omnidirectional antenna 28 that includes a wire loop 30 and a single ferrite rod loop 32 located substantially parallel to a plane formed by the wire loop 30. As illustrated, the single ferrite rod loop 32 may be centered with respect to the wire loop 30. In other implementations, the single ferrite rod loop 32 may not be centered or even inside the wire loop 30 provided that it is still oriented substantially parallel to the plane formed by the wire loop 30. Relevant teachings regarding the structure, materials, and use of various implementations of omnidirectional antennas that may be employed in implementations of radio communication systems 22 may be found in U.S. patent application Ser. No. 11/970,142 to Pease entitled "Omnidirectional Antenna System," filed Jan. 7, 2008, the disclosure of which is hereby incorporated herein by reference. In other implementations of radio communication repeaters (HF-MF or MF) discussed in this document, however, any other type of MF antenna could be utilized, whether omnidirectional or not such as, by non-limiting example, a single ferrite core antenna, a single wire loop, a double wire loop, a two crossed ferrite core antenna, or any other antenna structure.

The HF antenna 24 receives a first analog HF signal (such as one originating from an HF radio) and sends a second analog HF signal (such as one communicated by repeating using an MF signal from another HF-MF repeater). The HF-MF analog converter module 26 receives the first analog HF signal from the HF antenna and converts the first analog HF signal to a first analog MF signal. This conversion may be accomplished using any of a variety of analog signal conversion methods and systems in various implementations of HF-MF analog converter modules 26. The HF-MF analog converter module 16 also receives a second analog MF signal from the omnidirectional antenna 28 and converts the second analog MF signal to a second analog HF signal and sends the second analog HF signal to the HF antenna 24. The omnidirectional antenna 28 receives the first analog MF signal from the HF-MF analog converter module 26 and transmits the first analog MF signal into an enclosed space as well as receiving the second analog MF signal from the enclosed space and sending the second analog MF signal to the HF-MF analog converter module 26.

Figure 2B:
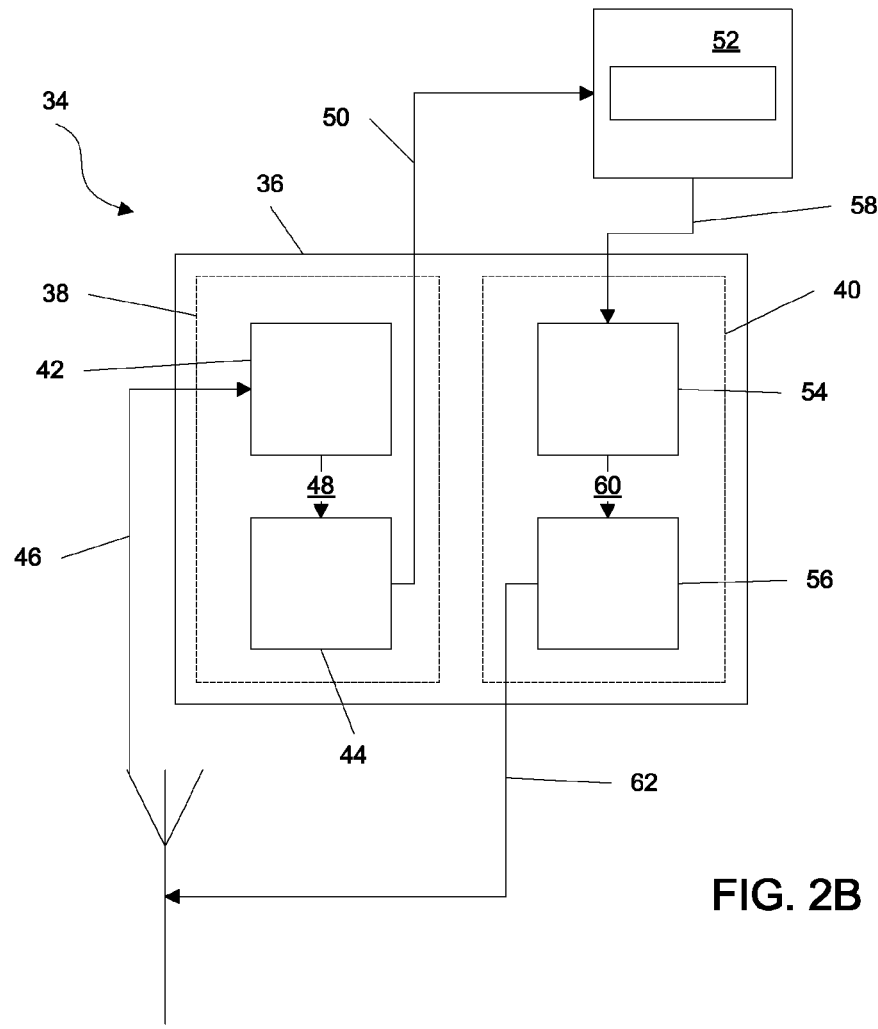
FIG. 2B is a block diagram of a second implementation of a radio communication system.

While many implementations of radio systems utilizing HF-MF analog converter modules 26 are possible, FIG. 2B illustrates a second implementation of a radio system utilizing an HF-MF analog converter module 34. As illustrated, the HF-MF analog converter module 36 of the radio system 34 includes an HF conversion side 38 and an MF conversion side 40. The HF conversion side 38 includes a first HF demodulator 42 coupled to a first MF modulator 44. The first HF demodulator 42 converts the first analog HF signal 46 to a first analog baseband signal 48. The first MF modulator 44 converts the first analog baseband signal 48 to the first analog MF signal 50, which is then routed to the omnidirectional antenna 52. Any other type of MF antenna disclosed in this document could also be utilized. The MF conversion side 40 includes a second MF demodulator 54 coupled with a second HF modulator 56. The second MF demodulator 54 converts the second analog MF signal 58 to a second analog baseband signal 60. The second HF modulator 56 converts the second analog baseband signal 60 to the second analog HF signal 62. Implementations of a radio system 34 may utilize any of a wide variety of conventional modulators and demodulators capable of converting either an HF or MF signal to a baseband signal or vice versa.

Figure 2C:
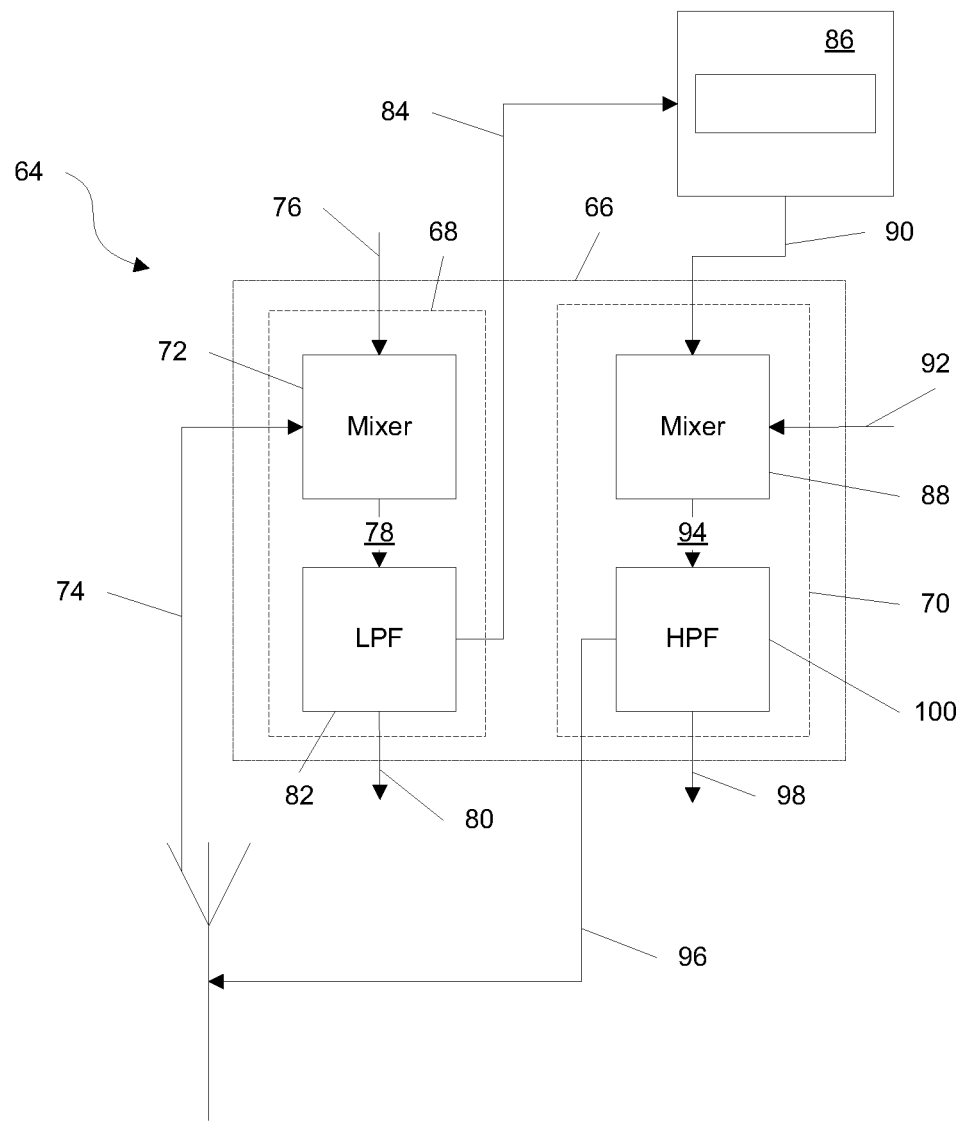
FIG. 2C is a block diagram of a third implementation of a radio communication system.

Referring to FIG. 2C, a second implementation of a radio system utilizing an HF-MF analog converter module 64 is illustrated. As illustrated, the HF-MF analog converter module 66 may include an HF conversion side 68 and an MF conversion side 70. The HF conversion side 68 includes a first radio frequency (RF) mixer 72 that multiplies the first analog HF signal 74 with a first analog pure wave signal 76 to produce an intermediate analog MF signal 78. The intermediate analog MF signal 78 includes a first analog MF signal 86 and a first analog sum frequency signal 80. A low pass filter 82 is coupled with the first RF mixer 72, receives the intermediate analog MF signal 78, and filters the first analog sum frequency signal 80 to produce the first analog MF signal 84, which is then sent to the omnidirectional antenna 86. Any other type of MF antenna could also be used in particular implementations. The MF conversion side 70 includes a second RF mixer 88 that multiplies the second analog MF signal 90 with a second analog pure wave signal 92 to produce an intermediate analog HF signal 94 including a second analog HF signal 96 and a second analog sum frequency signal 98. A high pass filter 100 is coupled with the second RF mixer 72, receives the intermediate analog HF signal 94, and filters the second analog sum frequency signal 98 to produce the second analog HF signal 96. While in FIG. 2C the first and second analog sum frequency signals 80, 98 are shown as exiting from the low pass filter 82 and high pass filter 100, respectively, in various implementations, the first and second analog sum frequency signals 80, 98 will be entirely canceled by the low pass filter 82 and the high pass filter 100 and thus no signal will be produced. Any of a wide variety of mixer types and low and high pass filter types may be used in particular implementations. In particular implementations, the first RF mixer 72 and second RF mixer 88 may be a single mixer configured to switch modes depending upon the frequency of the signal (HF/MF) being received.

Figure 3:
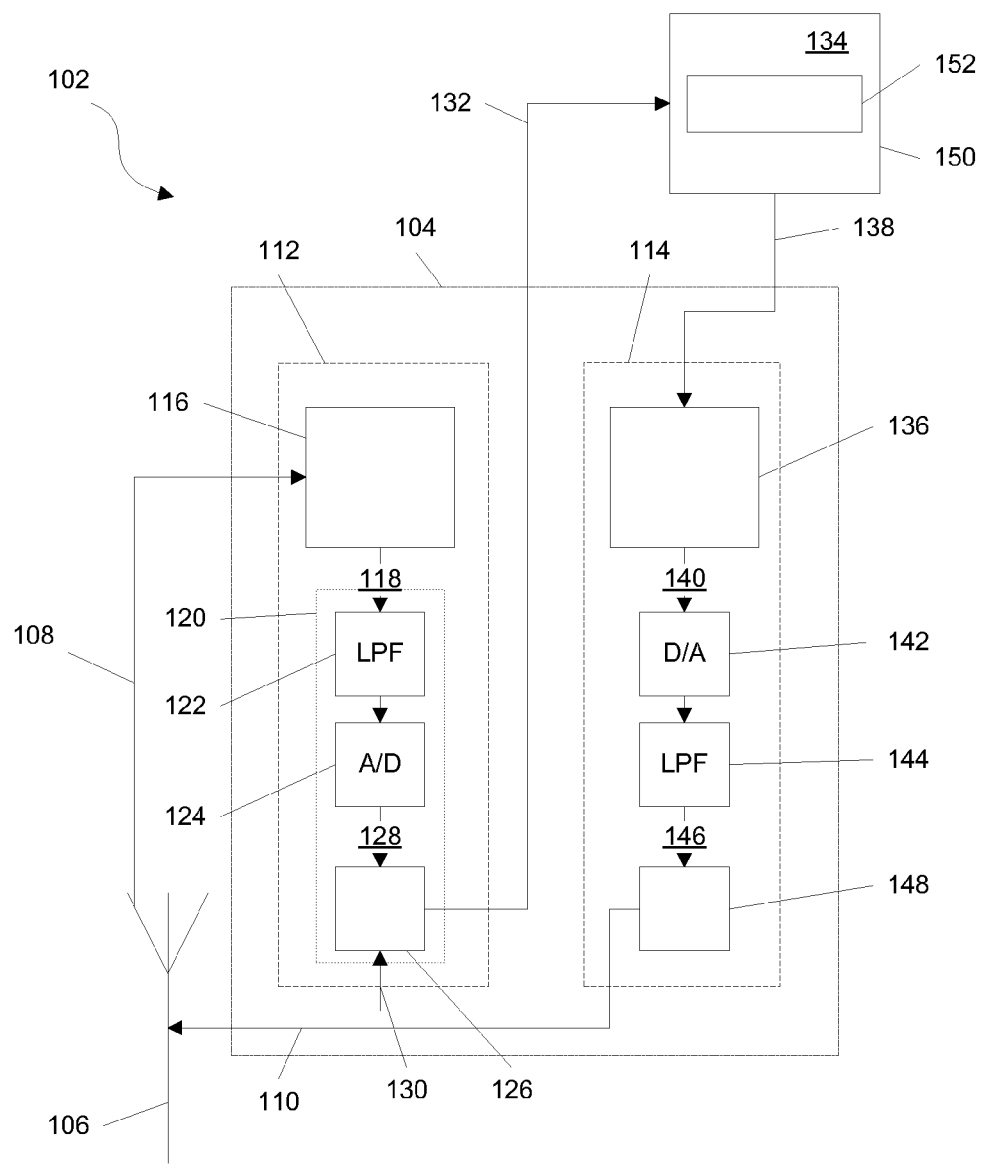
FIG. 3 is a block diagram of a fourth implementation of a radio communication system.

Referring to FIG. 3, an implementation of a radio system utilizing an HF-MF digital converter module 102 is illustrated. As illustrated, the radio system 102 includes an HF-MF digital converter module 104 coupled with an HF antenna 106 that receives a first analog HF signal 108 and a second analog HF signal 110. The HF-MF digital converter module 104 includes an HF conversion side 112 and an MF conversion side 114. The HF conversion side 112 includes an HF demodulator 116 that converts the first analog HF signal 108 to a first analog baseband signal 118. A digital modulator 120 is coupled with the HF demodulator 116 and includes a low pass filter 122, an analog-to-digital (A/D) converter 124, and a phase shift keyed (PSK) modulator 126. The low pass filter 122 and the A/D converter convert the first analog baseband signal 118 to a first digital baseband signal 128 and the PSK modulator 126 combines the first digital baseband signal 128 with an MF carrier signal 130 to produce a first digital MF signal 132. The first digital MF signal 132 then is sent to an omnidirectional antenna 134. Any other type of MF antenna disclosed in this document could also be utilized.

The MF conversion side 114 includes a PSK demodulator 136 that converts a second digital MF signal 138 from the omnidirectional antenna 134 to a second digital baseband signal 140. A digital-to-analog (D/A) converter 142 and a low pass filter 144 are coupled with the PSK demodulator 136 and converts the second digital baseband signal 140 to a second analog MF signal 146. An HF modulator 148 receives the second analog MF signal 146, converts the second analog MF signal 146 to the second analog HF signal 110, and sends the second analog HF signal 110 to the HF antenna 106. The omnidirectional antenna 134 includes a wire loop 150 and a single ferrite rod loop 152 oriented substantially parallel to a plane formed by the wire loop 150. The omnidirectional antenna 134 receives the first digital MF signal 132 from the HF-MF digital converter module 104 and transmits it into an enclosed space. The omnidirectional antenna 134 also receives the second digital MF signal 138 from the enclosed space and sends it to the HF-MF digital converter module 104.

While the use of a PSK demodulator 136 in the digital modulator 120 to generate the digital baseband signal 128 is illustrated in FIG. 3, any of a wide variety of digital modulation schemes or protocols including constant amplitude digital modulation may be utilized in particular implementations, including, by non-limiting example, frequency shift keying (FSK), binary phase shift keying (BPSK), Gaussian minimum shift keying (GMSK), quadrature amplitude modulation (QAM), or any other digital modulation technique. Also, while the use of HF analog signals has been illustrated in FIGS. 2A, 2B, 2C, and 3, digital HF signals and corresponding digital HF components utilizing any particular digital modulation technique could also be utilized. Also, any number of potential D/A and A/D converters, along with low pass filter implementations may be utilized. In addition, methods of speech modulation such as, by non-limiting example, advanced multiband excitation (AMBE), delta modulation, or any other method of speech modulation may be utilized. Also various methods of data transfer methods, including, by non-limiting example, ASCII, binary, file transfer protocol (FTP), transmission control protocol (TCP), or any other data transfer method or protocol, may be utilized to transfer data and/or aid in establishing connections between implementation of HF-MF repeaters or any other type of radio frequency repeater.

Figure 4:
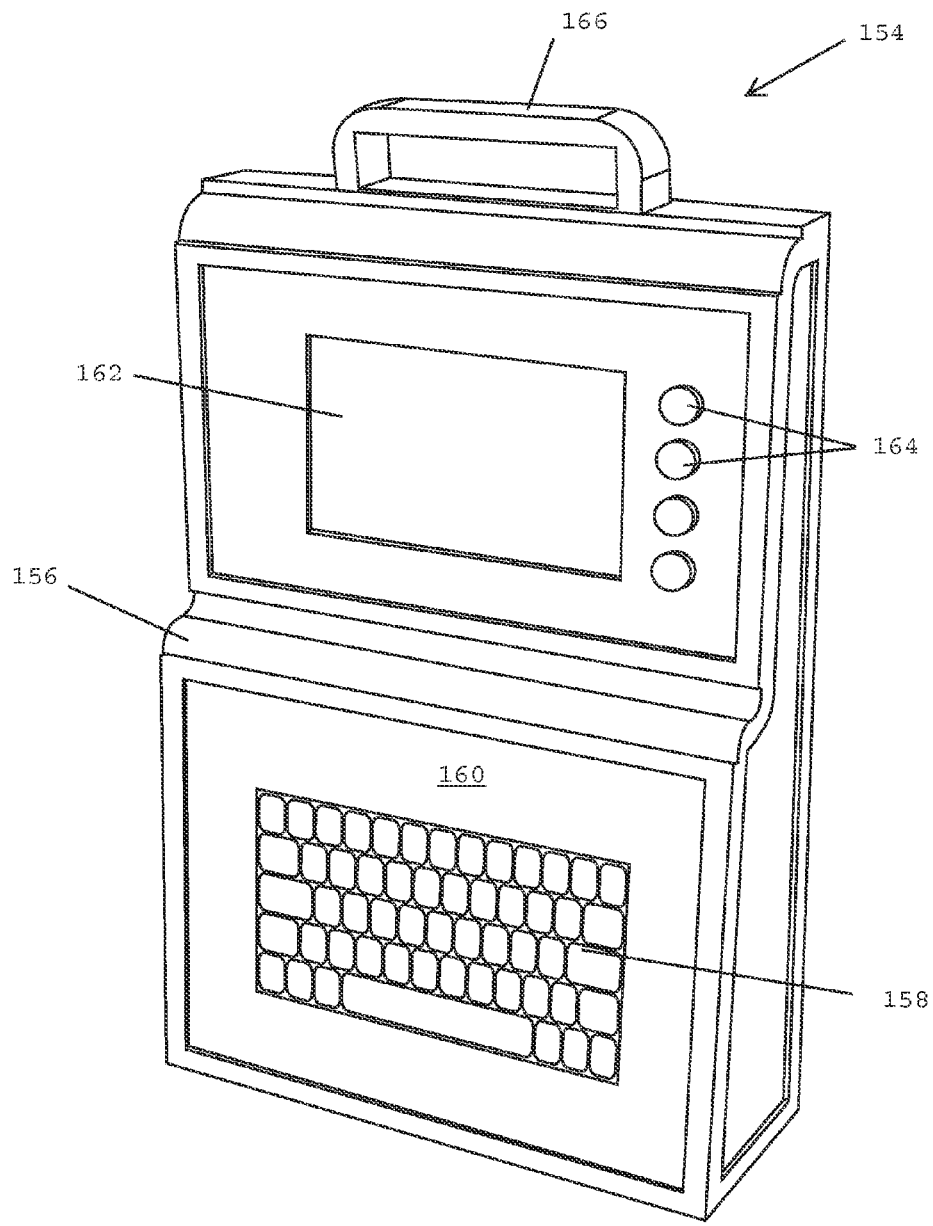
FIG. 4 is a front perspective view of an implementation of a radio frequency repeater.

Implementations of radio systems may utilize various implementations of radio frequency repeaters, including HF-MF or MF repeaters. Referring to FIG. 4, an implementation of an HF-MF repeater 154 is illustrated. As illustrated, the HF-MF repeater 154 may include a housing 156 and a keyboard 158 capable of inputting various characters. In particular implementations, the keyboard 158 may be coupled in a surface 160 of the housing 156; in other implementations, the keyboard 158 may be coupled with the HF-MF repeater 154 through a wired or wireless connection. A display 162 may also be included to display one or more characters and may be any of a wide variety of display types, including, by non-limiting example, a light emitting diode (LED) display, a liquid crystal display (LCD), a cathode ray tube, or any other display system. Implementations of HF-MF repeaters 154 having keyboards 158 and displays 162 may be capable of sending pictures, text, and other data as well as audio. A plurality of input/output buttons or input/output ports 164 may be included to allow for operation of various features of the display 162 or to permit any of a wide variety of input/output devices to be coupled with the HF-MF repeater 154. Some of these input/output devices may include, by non-limiting example, a handheld microphone/speaker, a flash drive, a light, a speaker, a computer, or any other electronic device. A handle 166 for carrying of the HF-MF repeater 154 may also be included.

Figure 5A:
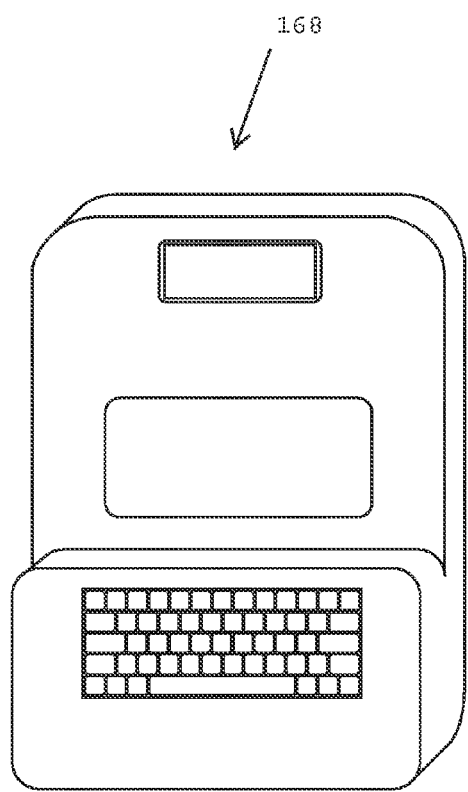
FIG. 5A is a front perspective view of another implementation of a radio frequency repeater.
Figure 5B:
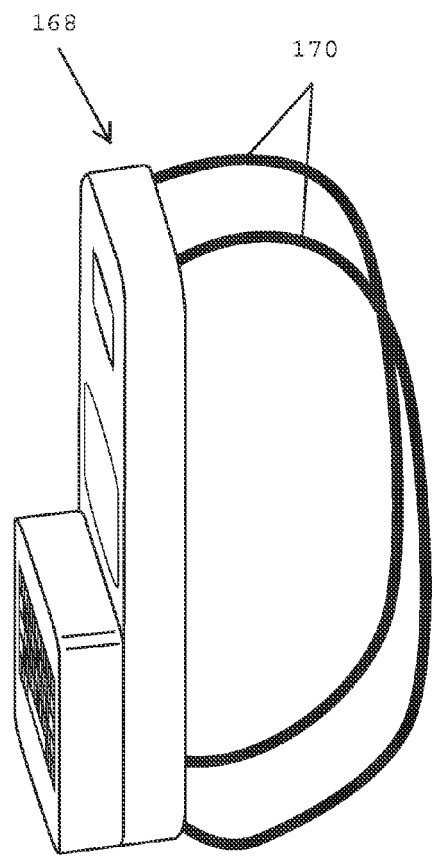
FIG. 5B is a side perspective view of the implementation of the radio frequency repeater illustrated in FIG. 5A.

Referring to FIGS. 5A and 5B, another implementation of an HF-MF repeater 168 is illustrated. As illustrated, the HF-MF repeater 168 has a different overall shape and lacks a handle projecting from the housing, however, the HF-MF repeater 168 includes shoulder straps 170 that allow a user to carry the unit on his or her back. Other implementations of HF-MF repeaters may include the capability to be carried via handle and shoulder straps, as well as capabilities for permanent or semi-permanent mounting to floors, walls, or ceilings of enclosures such as mine tunnels.

Figure 6:
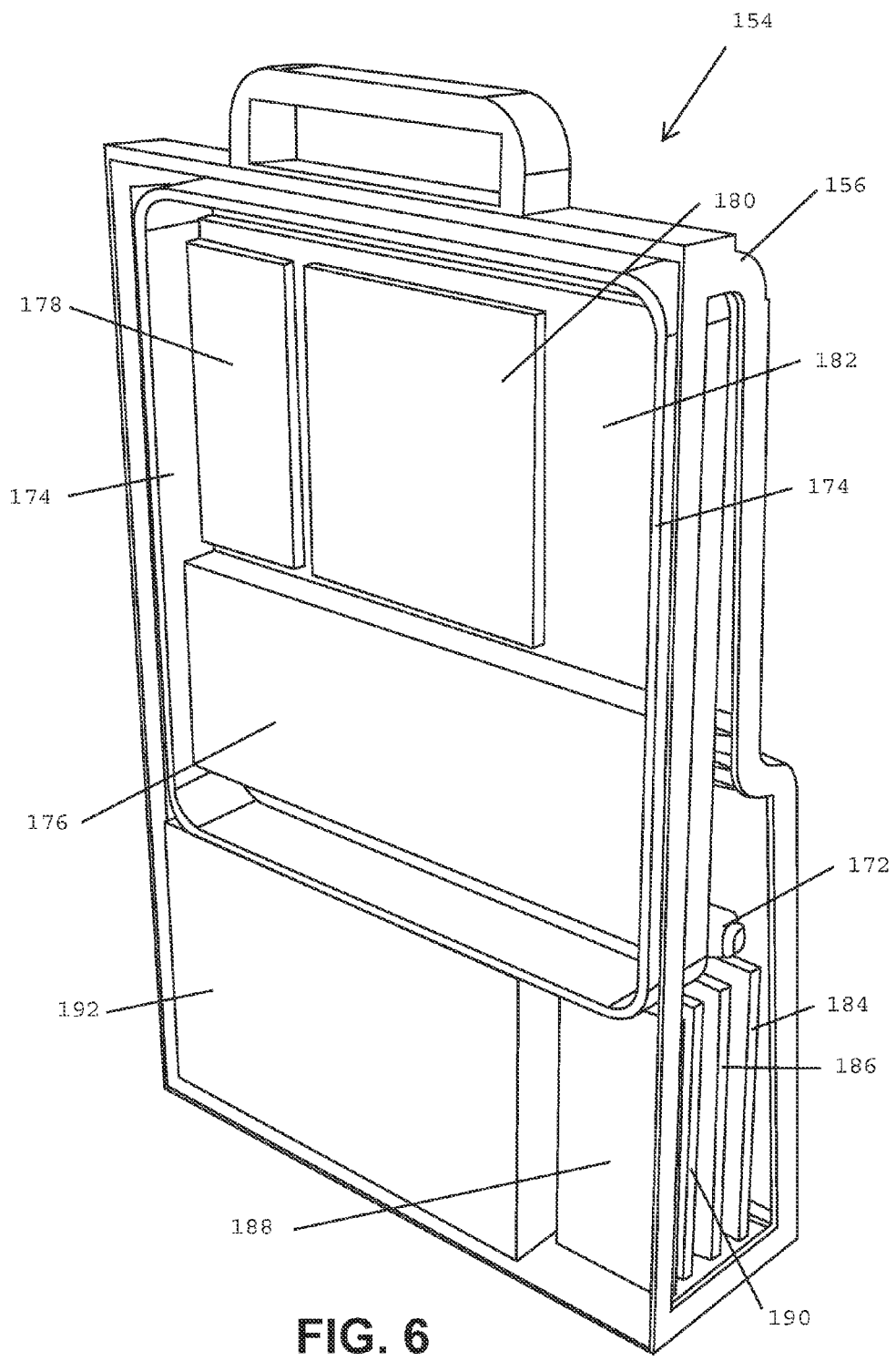
FIG. 6 is a rear perspective view of an implementation of the radio frequency repeater like the one illustrated in FIG. 4 with the rear panel and side panels cut away.

Referring to FIG. 6, a rear perspective view of the implementation of the HF-MF repeater 154 illustrated in FIG. 4 is illustrated with rear and side portions of the housing 156 removed. As illustrated, the HF-MF repeater 154 includes an HF antenna 172 and an omnidirectional antenna including a wire loop 174 with a single ferrite rod loop 176. As illustrated, the single ferrite rod loop 176 is oriented substantially parallel to a plane formed by the wire loop and is not centered with respect to the wire loop 174. In other particular implementations of omnidirectional antennas, the single ferrite rod loop 176 may be located outside the wire loop 174 provided that it remains oriented substantially parallel to the plane formed by the wire loop 174. In other particular implementations, the HF-MF repeater 154 may include any of the previously discussed MF antenna types and may not be omnidirectional.

As illustrated, an antenna matching network board 178, frequency translating board 180, and radio board 182 may all be included. In particular implementations of HF-MF repeaters 154, one or more of these three boards may not be included or the functionality of one or more of these three boards may be incorporated into one or more boards or into another portion of the HF-MF repeaters. In various implementations, only a frequency translating circuit may be included that may include the functionality of the antenna matching network board 178, the frequency translating board 180 and/or the radio board 182. The frequency translating circuit may be included in one or more circuit boards. An MF transceiver 184 and HF transceiver 186 may also be included and the combination of the antenna matching network board 178, frequency translating board 180, radio board 182, MF transceiver 184, and HF transceiver 186 may perform a majority of the HF to MF frequency reception, conversion, and tuning required for the HF-MF repeater 154 to operate. In other particular implementation, additional boards and/or devices may be included to perform any of the HF to MF frequency reception, conversion, and tuning functions. Implementations may also include boards that combine the functionality of the MF transceiver 184 and/or the HF transceiver 186 with the frequency translating circuit in one or more boards. A digital input/output (I/O) control board 188 may also be included to allow some or all of the other boards and devices in the HF-MF repeater 154 to interface with each other. The digital I/O control board 188 may also communicate with the display 162 and keyboard 158. A battery charging circuit 190 and battery 192 may also be included and may be incorporated within the housing 156 of the HF-MF repeater 154. In other implementations, the battery 192 and battery charging circuit 190 may be external to the housing 156 or not included, as in radio frequency repeater units, like HF-MF repeater and MF repeater units that rely wholly on an external power source.

Figure 7:
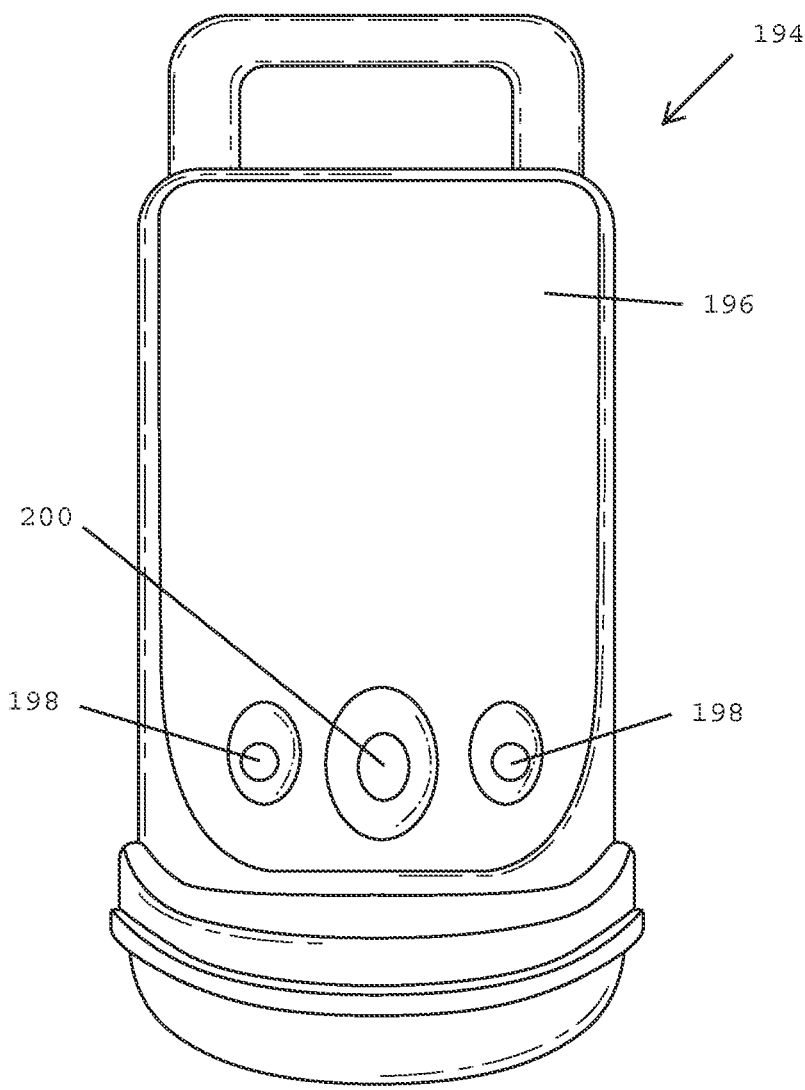
FIG. 7 is a front view of another implementation of a radio frequency or HF-MF repeater.

Referring to FIG. 7, another implementation of a radio frequency repeater 194 is illustrated. As illustrated, the radio frequency repeater 194 may include a ruggedized housing or enclosure 196. The enclosure 196 may be made of any of wide variety of rugged materials, such as, by non-limiting example, polycarbonates, metals, Kevlar®, Lexan®, composites, or any other durable material. The enclosure 196 may also be explosion proof (XP) and may be designed to comply with various military and governmental safety standards, such as U.S. MIL-STD 810 and other regulations promulgated by the U.S. Mine Safety and Health Administration (MSHA). Various indicator lights 198 and one or more I/O ports 200 and a power switch may also be included as part of the radio frequency repeater 194. In particular implementations of radio frequency repeaters, speaker/microphone units may also be coupled with the radio frequency repeaters through the one or more I/O ports 200 or may be permanently connected with the radio frequency repeaters. The use of ruggedized enclosures may allow the radio frequency repeater 194 to be carried by its handle 202 throughout a mine or other enclosed space without being damaged by bumping into obstacles, falls, or being set down on rough and rocky surfaces. The radio frequency repeater 194 illustrated in FIG. 7 may operate using either digital or analog radio components. In particular implementations, the handle 202 may be located on the longer dimension of the radio frequency repeater 194.

Figure 8:
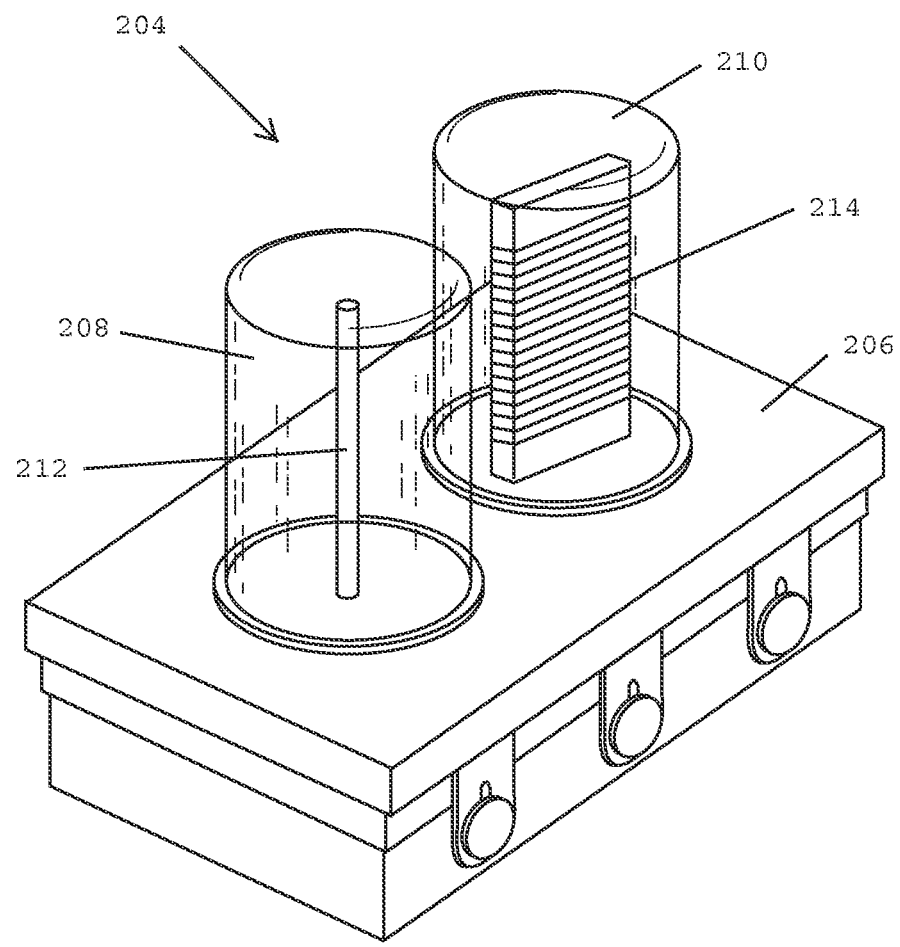
FIG. 8 is a perspective view of another implementation of an HF-MF repeater.

Referring to FIG. 8, another implementation of an radio frequency repeater 204 is illustrated. As illustrated, the radio frequency repeater 204 implementation has a housing 206 which may be made of any of a wide variety of materials, and a first dome 208 and a second dome 210 that extend from the housing 206. Within the first dome 208 may be an HF antenna 212, and within the second dome 210 may be a MF antenna 214. The MF antenna 214 may be any of the omnidirectional or non-omnidirectional types discussed in this document. In the implementation illustrated in FIG. 8, the antenna is a single ferrite loop antenna including a wire loop wrapped around a single ferrite rod. The orientation of windings of the wire loop can be wound in any orientation or combination. The extending of the HF antenna 212 and the omnidirectional antenna 214 into the first dome 208 and second dome 210, respectively, may allow the radio frequency repeater 204 to operate without undue interference if the housing 206 is constructed of a metal or other rugged material. The first dome 208 and second dome 210 may be constructed of a wide variety of the previously mentioned rugged non-metallic materials such as Lexan® to permit transmission of the HF and MF signals through them. In the implementation of the radio frequency repeater 204 illustrated in FIG. 8, the housing 206 is constructed of an aluminum material and may be explosion proof (XP). Implementations of radio frequency repeaters 204 may be used primarily with analog radios, although digital radio components could also be used in particular implementations.

Figure 9:
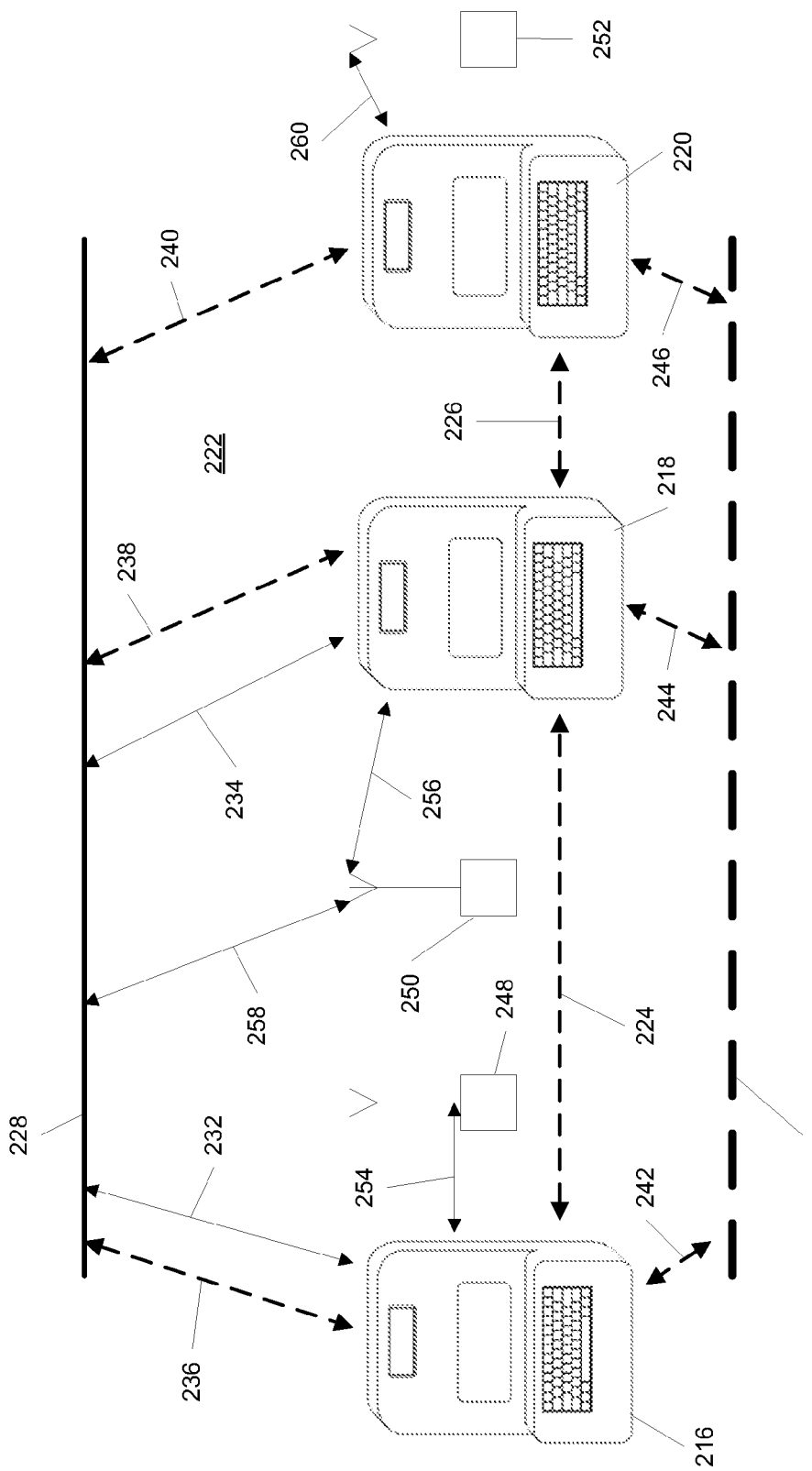
FIG. 9 is a diagram of implementations of several HF-MF repeater units, a leaky feeder cable, a dedicated MF communication cable, and a plurality of HF radios illustrating various communication modes.

Implementations of radio frequency repeaters 154, 168, 194, and 204 may be utilized in combination with implementations of HF radios in a wide variety of ways. Referring to FIG. 9, a diagram of various radio frequency repeaters 216, 218, and 220 (here HF-MF repeaters or MF repeaters) are shown in an enclosed space 222. In the diagram in FIG. 9, dashed lines indicate MF signals and solid lines indicate HF signals. The HF-MF repeaters 216, 218, and 220 can be directly connected via the direct MF signals 224 and 226. In particular implementations of radio frequency repeaters, if the HF-MF repeaters 216, 218, and 220 utilize analog radio components, any two of the repeaters may be capable of direct connection, but not all three simultaneously. For example, if the direct MF signal 226 was sent from HF-MF repeater 220 to HF-MF repeater 218, HF-MF repeater 218 could not then forward that MF signal to HF-MF repeater 216. In other words, implementations of radio frequency repeaters utilizing analog radio components may not be able to "hop" MF signals from repeater to repeater. According, any MF networks formed using direct repeater to repeater MF connections may be no larger than two repeaters in size.

However, in implementations of radio frequency repeaters utilizing digital radio components, the various radio frequency repeaters may be able to hop MF signals from repeater to repeater. In addition, the various radio frequency repeaters may be able to maintain direct MF signal connections with more than one repeater at a time and form a "mesh" MF network capable of distributing MF signals along the multiple pathways created by the multiple connections. In such MF networks, any of the previously discussed signal transmission techniques can be used to route MF signals (broadcast, anycast, etc).

As illustrated, the HF-MF repeaters 216, 218, and 220 may connect to each other through more than just the direct MF signals 224 and 226 by using a leaky feeder cable 228 and/or a conductor 230, which may be any powered or non-powered wire or piece of metal in the enclosed area. When making connections using the leaky feeder cable 228 and/or the conductor 230, the leaky feeder cable 228 or the conductor 230 may be considered a part of the MF network because each is serving as a signal relay to enable one or more HF-MF repeaters to communicate with each other. As illustrated, HF-MF repeaters 216 and 218 may communicate using the leaky feeder cable 228 using either HF signals 232, 234 or the MF signals 236, 238. Because the leaky feeder cable 228 can relay both HF signals and MF signals, either form of signal can be used to connect the HF-MF repeaters with each other. While connection through HF signals may be possible, particular implementations of HF-MF repeaters may be programmed to connect only through MF signals, as is illustrated by MF signal 240 and HF-MF repeater 220. Also, where leaky feeder cables 228 are not present, if a conductor 230 is present in the mine, the HF-MF repeaters may communicate with each other and form an MF network using MF signals 242, 244, and 246. In particular implementations of HF-MF repeaters, connections between the HF-MF repeaters may be effected by using both HF and MF signals and the leaky feeder cable 228 and MF signals through the dedicated MF communication cable.

A plurality of HF radios 248, 250, and 252 may be distributed throughout the enclosed space 222 and may communicate with each other and with the HF-MF repeaters 216, 218, and 220 in various configurations. For example, HF radio 248, not in direct connection with HF radio 250 through an HF signal, may be placed in communication by connecting with HF-MF repeater 216 through HF signal 254 and then by using MF signal 236, the leaky feeder cable 228, MF signal 238, and HF signal 256 to complete the connection. Alternatively, the HF-MF repeaters 218 and 218 may be operated as HF only signal repeaters and use HF signals 254 and 232, the leaky feeder cable 228, and HF signals 234 and 256 to make the connection. Because the HF radios are capable of communicating directly through the leaky feeder cable 228, HF radio 250 may also communicate with HF radio 248 by using HF signal 258, the leaky feeder cable 228 and HF signals 232 and 254. While the leaky feeder cable 228 has been used in these illustrations to aid in connecting the two HF radios together, MF signal 224 or MF signals 242 and 224 in combination with the conductor 230 could also be used to make the connections.

When MF signals are used to connect two HF radios together, such as is illustrated when HF radio 252 is connected with HF radio 250 through HF signal 260, MF signals 240 and 238 and HF signal 256, a virtual HF channel can be created using the HF-MF converters 218, 220. Because HF radios can receive HF signals on various channels, one HF radio 250 may be set to receive HF signals on a different channel than an HF radio 252 located in a different part of the enclosed space 222. However, if those same two HF radios 250, 252 were connected via different HF channels to two different HF-MF repeaters 218, 220, they would still be in communication via the MF signals 238, 240 despite using different HF channels. Accordingly, the MF signals 239, 240 and the HF-MF repeaters 218, 220 may form a virtual HF channel, allowing different HF radios on different HF channels connected to different MF repeaters to stay in communication with each other. In other arrangements, all of the HF radios may be connected to the same HF channel, but may be completely out of HF signal range from each other as is illustrated by HF radios 252 and 250. When connected through HF-MF repeaters 220, 218 and MF signals 240, 238, a virtual HF channel may be formed to still allow the HF radios 252 and 250 to remain in communication with each other on the same HF channel.

As illustrated in FIG. 9, the HF-MF repeaters 216, 218, and 220 may also form an MF network that allows the plurality of HF radios 248, 250, and 252 to connect with each other even if at least two of the HF radios are not in direct connection. Also, when the HF-MF repeaters 216, 218, and 220 are connected as a mesh MF network, signals from the HF radios 248, 250, and 252 can be routed in any particular order. For example, HF radio 248 may be connected with HF radio 250 by HF signal 254, MF signal 242, the conductor 230, MF signal 246, MF signal 226, and HF signal 256. Any of a wide variety of other signal routing possibilities could be used. When an MF network or mesh MF network is formed, connection redundancy for each HF radio in the network may be enhanced because if a particular HF-MF repeater fails or is destroyed in an accident, MF signals can still be rerouted using other already connected and available repeaters. Also, implementations of radios transmitting and receiving only MF signals may be utilized in conjunction with the HF-MF repeaters 216, 218, 220 and may be handheld or fixed position radios.

Figure 10:
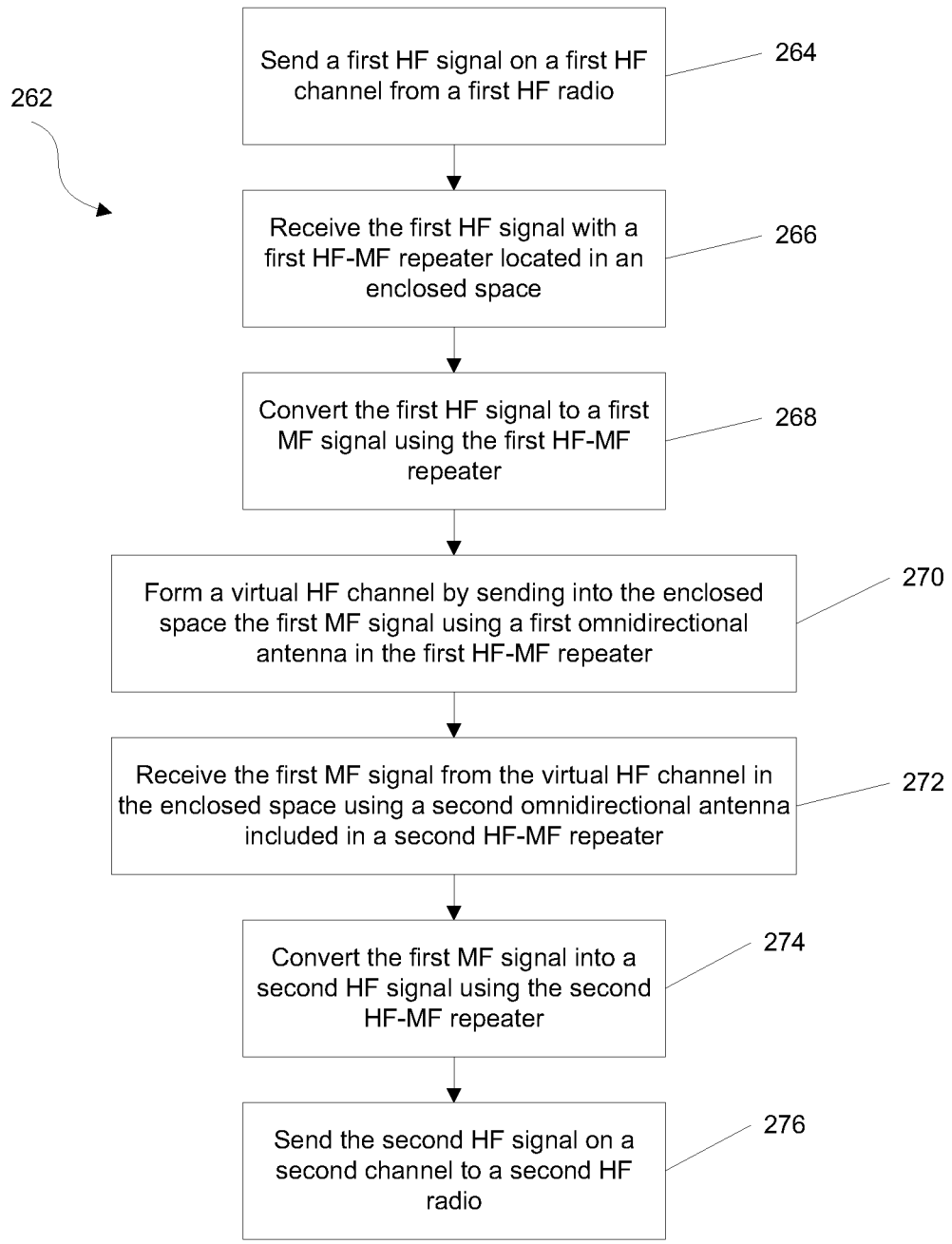
FIG. 10 is a flowchart of a method of using a virtual HF channel to enable radio communication in an enclosed space.

FIG. 10 illustrates an implementation of a method of using a virtual HF channel to enable radio communication in an enclosed space 262. As illustrated, the method 262 includes sending a first HF signal on a first HF channel from a first HF radio (step 264), receiving the first HF signal with a first HF-MF repeater located in an enclosed space (step 266), and converting the first HF signal to a first MF signal using the first HF-MF repeater (step 268). The method 262 also includes forming a virtual HF channel by sending into the enclosed space the first MF signal using a first omnidirectional antenna in the first HF-MF repeater (step 270) and receiving the first MF signal from the virtual HF channel in the enclosed space using a second omnidirectional antenna included in a second HF-MF repeater (step 272). The method 262 includes converting the first MF signal into a second HF signal using the second HF-MF repeater and sending the second HF signal on a second channel to a second HF radio (step 276). In implementations of the method 262, the first HF channel actually being used by the first HF radio may be the same channel (same frequency channel or frequency band segment) as the second HF channel being utilized by the second HF radio. In other implementations, the first HF channel and second HF channel may be different channels occupying separate segments of the frequency band. In particular implementations of the method 262, any conductor may be utilized to form the virtual HF channel. Also, any combination of radio frequency repeaters disclosed in this document may be utilized in implementations of the method.

Figure 11:
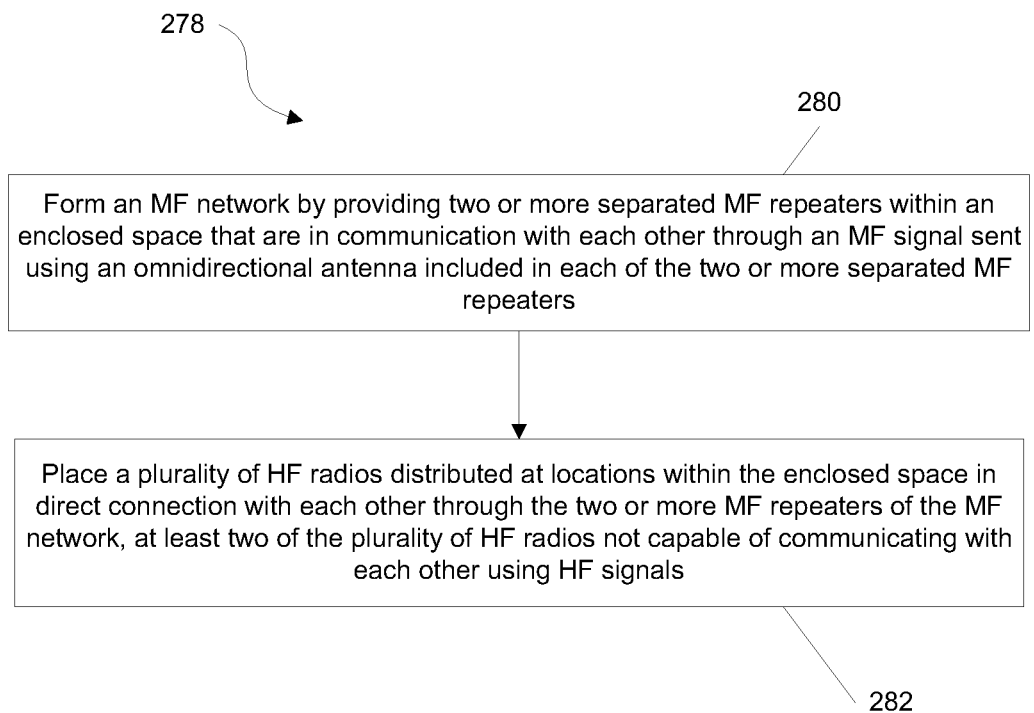
FIG. 11 is a flowchart of a method of using an MF repeater network to transmit HF signals between a plurality of HF radios within an enclosed space.

Referring to FIG. 11, an implementation of a method of using an MF repeater network to transmit HF signals between a plurality of HF radios within an enclosed space 278 is illustrated. As illustrated, the method 278 includes forming an MF network by providing two or more separate radio frequency repeaters, which may be HF-MF repeaters or MF repeaters, within an enclosed space that are in communication with each other through an MF signal sent using an omnidirectional antenna included in each of the two or more separate MF repeaters (step 280). The method 278 also includes placing a plurality of HF radios distributed at locations within the enclosed space in direct connection with each other through the two or more MF repeaters of the MF network where at least two of the plurality of HF radios are not capable of communicating with each other using HF signals. In particular implementations, a conductor may be incorporated into the MF network to place at least two of the two or more MF repeaters in the MF network in communication with each other.

Figure 12:
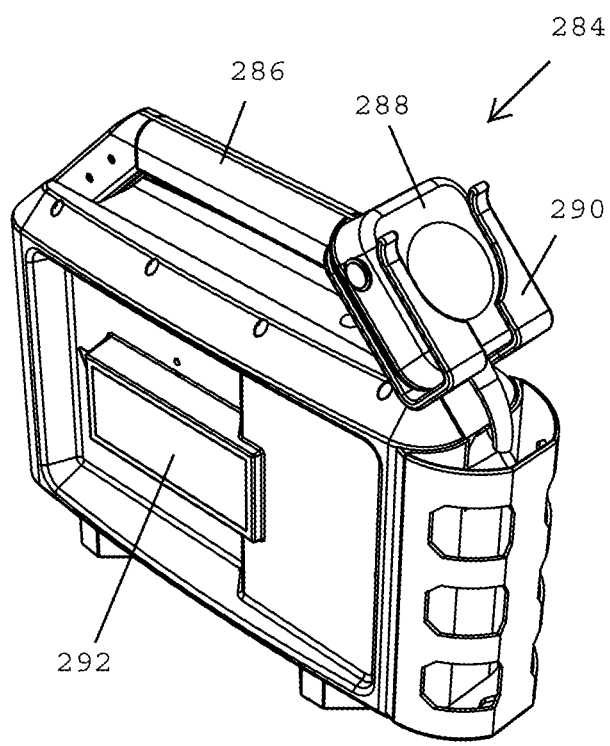
FIG. 12 is a perspective view of another implementation of a radio frequency repeater.
Figure 13:
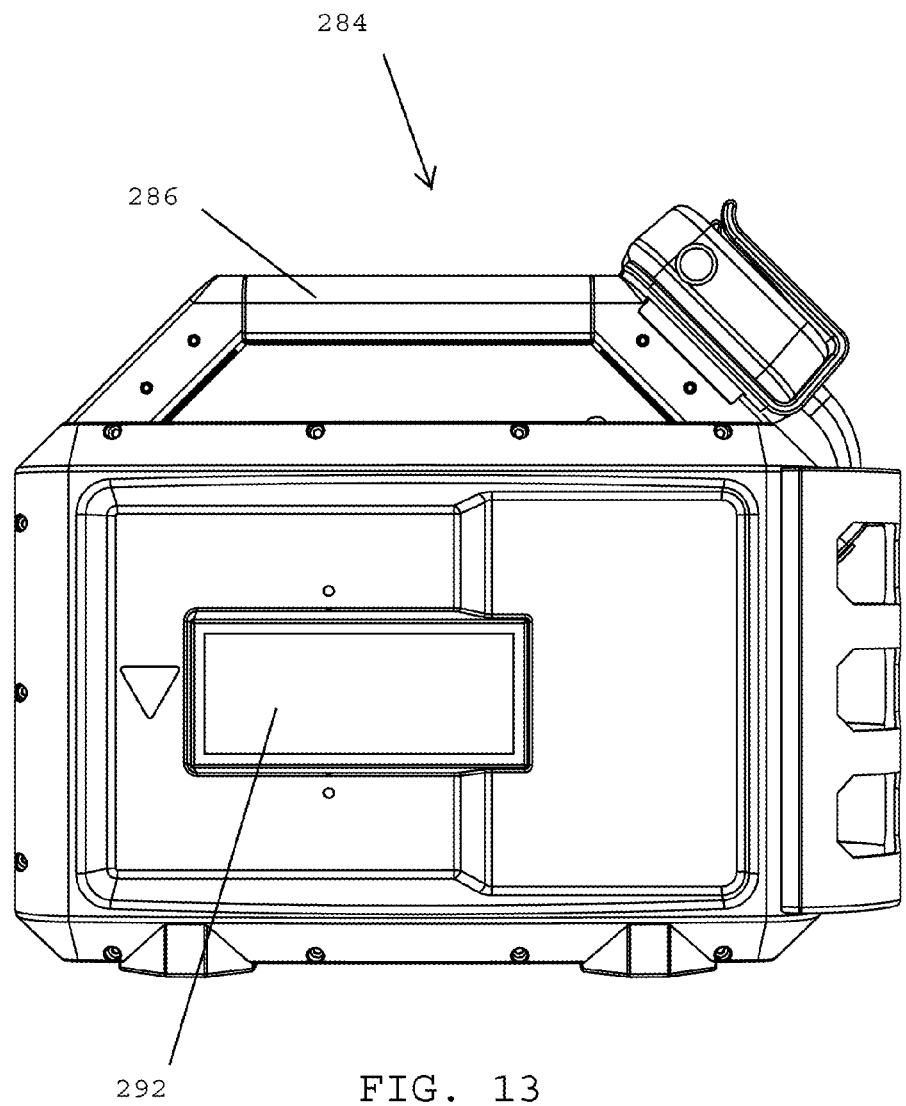
FIG. 13 is a side view of another implementation of a radio repeater.

Referring to FIG. 12, another implementation of a radio frequency repeater 284, which may be any HF-MF or MF repeater, is illustrated. As illustrated, the radio frequency repeater 284 may include a handle 286 along a long dimension of the radio frequency repeater 284 and a retractable speaker/microphone unit 288 coupled with a holder 290. In particular implementations, a display 292 may be included in a side of the radio frequency repeater 284. Displays 292 may be included particularly in implementations of radio frequency repeaters 284 that utilize digital radio components. Various system components (keyboards, buttons, selectors, and the like) may also be included to allow for the sending and receiving of character-based messages. FIG. 13 is a side view of the implementation of a radio frequency repeater 284 illustrated in FIG. 12 further showing the handle 286 and display 292.

The implementations of radio frequency repeaters disclosed in this document application (particularly those similar to the implementation illustrated in FIG. 2B) utilize radio frequency (RF) modulators to permit HF signals received by the HF antenna to be converted to an HF baseband signal and then to an MF signal, and vice versa. While the HF-MF analog converter module shown in FIG. 2B is described as having an HF conversion side and an MF conversion side, many particular arrangements of the components in the HF conversion side and the MF conversion side are possible and are further illustrated in this document.

Figure 14:
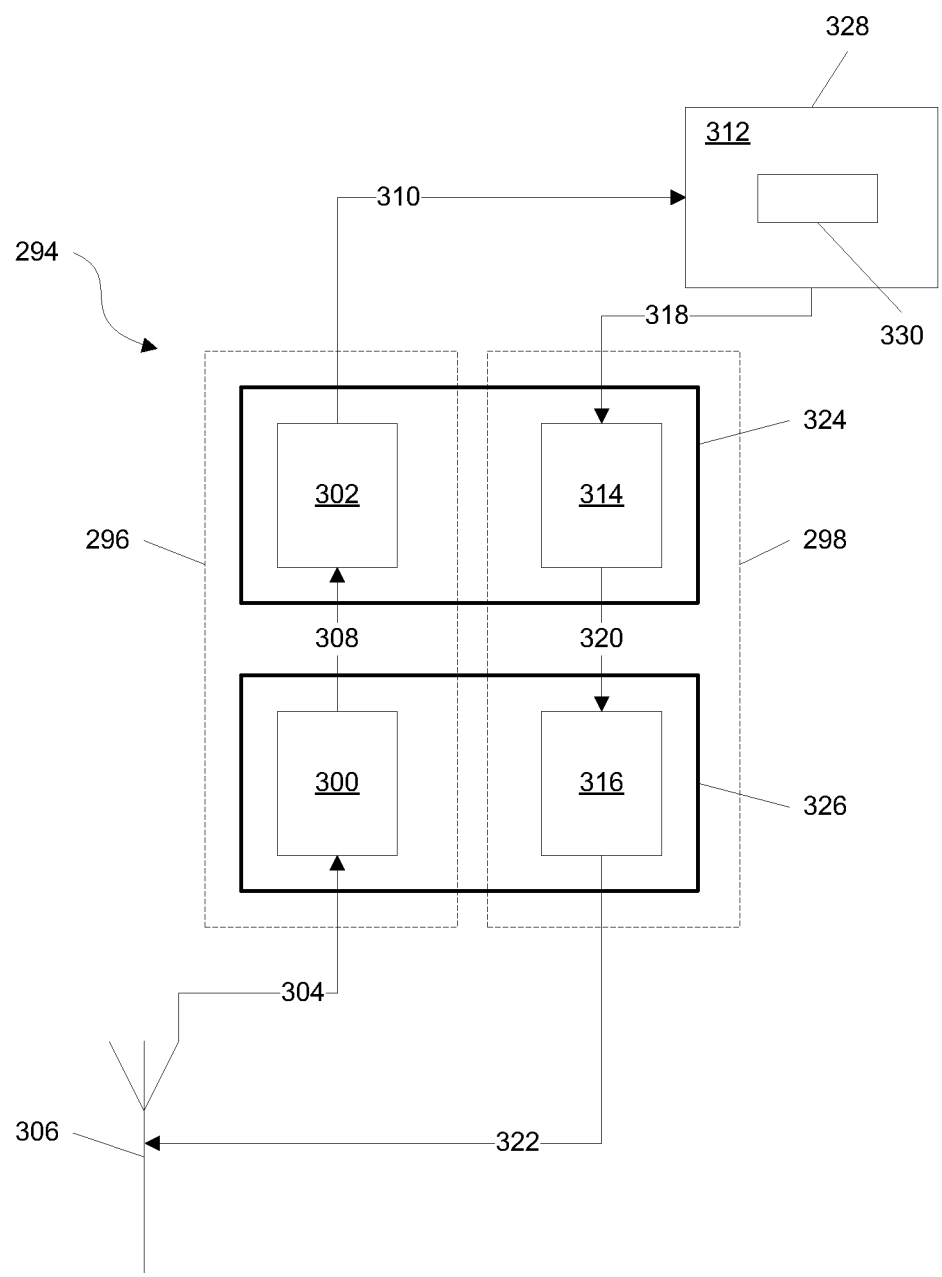
FIG. 14 is a block diagram of another implementation of a radio repeater.

Referring to FIG. 14, an implementation of a radio frequency repeater (HF-MF repeater or MF repeater) 294 is illustrated. As illustrated, the radio frequency repeater 294 includes an HF conversion side 296 and an MF conversion side 298. The HF conversion side 296 includes an HF demodulator 300 coupled with an MF modulator 302. The HF demodulator 300 is configured to convert an HF signal 304 received by the HF antenna 306 to an HF baseband signal 308 that is then sent to the MF modulator 302, modulated to an MF signal 310, then transmitted using an MF antenna 312. The HF baseband signal may be an audio signal and may not include any other control signals (such as a push to talk signal) or HF or MF modulation of any kind. The MF conversion side 298 includes an MF demodulator 314 coupled with an HF modulator 316. The MF demodulator 314 is configured to convert an MF signal 318 received by the MF antenna 312 to an MF baseband signal 320 which is then sent to the HF modulator 316 and transmitted as an HF signal 322 using the HF antenna 306.

In various implementations, the HF conversion side 296 and the MF conversion side 298 may be coupled through one or more cables, that allow for transfer of signals. In other implementations, the HF conversion side 296 and the MF conversion side 298 may be acoustically coupled. Acoustic coupling may take place by converting HF or MF signals received by either the HF conversion side 296 and the MF conversion side 298 to audio signals and using a speaker to emit the audio, which is then received by a microphone coupled to the HF conversion side 296 or the MF conversion side 298, depending upon which of the two sides has the speaker. In implementations where the HF conversion side 296 is incorporated into a standard HF radio that incorporates a button that enables a push to talk feature, the standard HF radio may be included within an enclosure that includes an actuator configured to press the button in response to a HF control logic signal received from the MF conversion side 298. In this way, the radio frequency repeater 294 is operable to transmit voice signals received at the either the HF conversion side 296 or the MF conversion side 298 using a standard HF radio with a push to talk feature.

The HF conversion side 296 and the MF conversion side 298 may be included in a single enclosure but physically separated (as when the two sides are formed on separate circuit boards) or may be included in a first enclosure and a second enclosure physically separated from each other. In addition, the MF modulator 302 and the MF demodulator 314 may be physically separate and, in particular implementations, may be included in an MF modulator enclosure and in a MF demodulator enclosure, respectively. The MF modulator 302 and the MF demodulator 314 may be coupled through cables or may be coupled using a first MF antenna coupled to the MF modulator 302 and a second MF antenna coupled to the MF demodulator where the first MF antenna and second MF antenna are in communication with each other. The first MF antenna and/or the second MF antenna may be omnidirectional antennas like those disclosed in this document or may be any other type of MF antenna. In various implementations, the various components of the HF conversion side 296 could also be physically separated.

While the foregoing components have been described in terms of being part of an HF conversion side 296 and an MF conversion side 298, the components may be physically separate, and in particular implementations, included within two separate enclosures, an MF unit 324 and an HF unit 326. The MF unit 324 may be included in a first enclosure and the HF unit 326 may be included in a second enclosure. The MF unit 324 and HF unit 326 may be physically separate containers linked by cables that carry the HF baseband signal 308 and the MF baseband signal 320 between the units in particular implementations. The MF unit 324 and the HF unit 326 may each include the MF-specific and HF specific components required to operate the radio frequency repeater 294. In other implementations, the MF unit 324 and HF unit 326 may consist of components mounted on separate circuit boards.

The HF MF antenna 312 may be an omnidirectional antenna that includes a wire loop 328 and a single ferrite rod loop 330 located substantially parallel to a plane formed by the wire loop 328. As illustrated, the single ferrite rod loop 330 may be centered with respect to the wire loop 328. In other implementations, the single ferrite rod loop 330 may not be centered or even inside the wire loop 328 provided that it is still oriented substantially parallel to the plane formed by the wire loop 328. Relevant teachings regarding the structure, materials, and use of various implementations of omnidirectional antennas that may be employed in implementations of radio frequency repeaters 294 may be found in the U.S. Patent Application to Pease previously incorporated herein by reference. In other implementations of radio communication repeaters (HF-MF or MF) discussed in this document, however, any other type of MF antenna could be utilized, whether omnidirectional or not such as, by non-limiting example, a single ferrite core antenna, a single wire loop, a double wire loop, a two crossed ferrite core antenna, or any other antenna structure.

Figure 15:
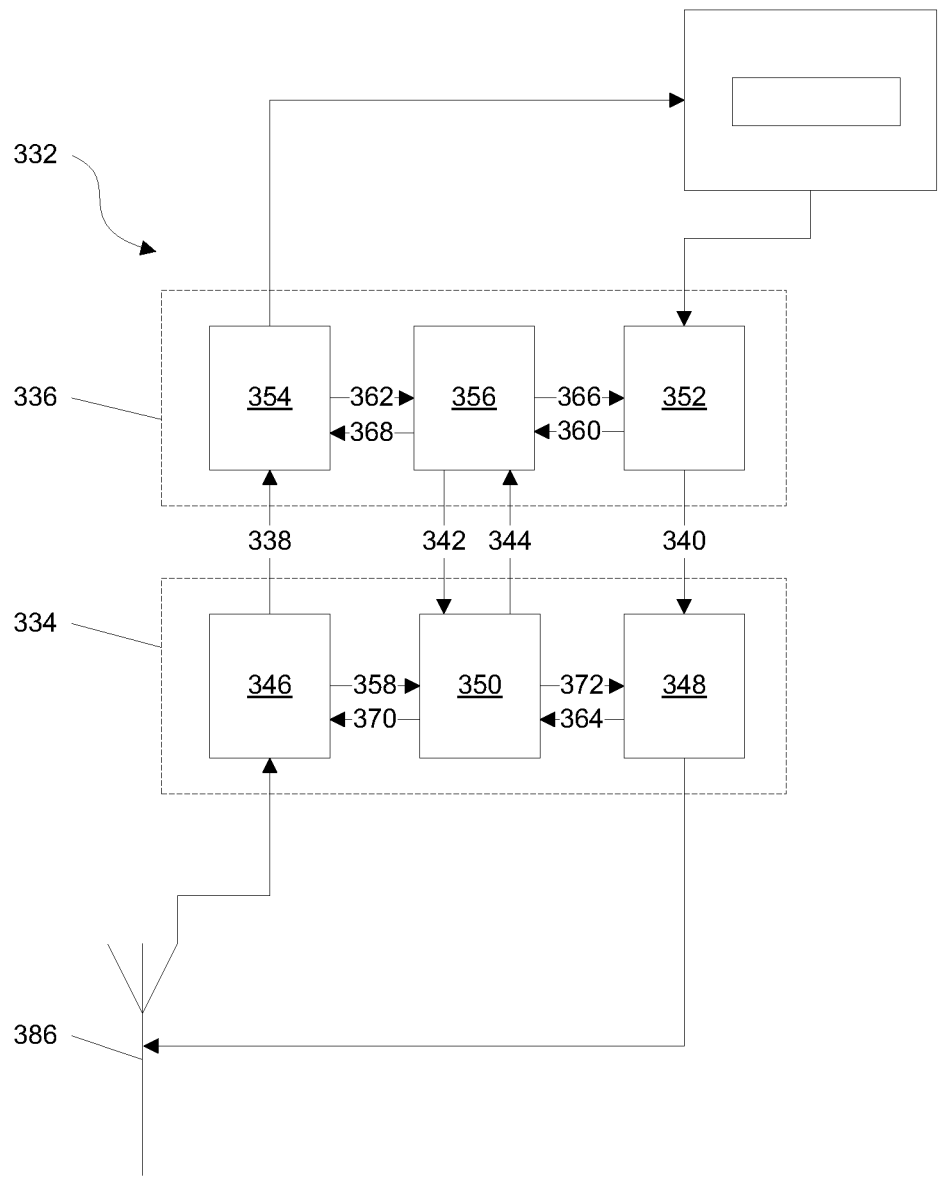
FIG. 15 is a block diagram of another implementation of a radio repeater.

Referring to FIG. 15, another implementation of a radio frequency repeater 332 is illustrated. As illustrated, the radio frequency repeater 332 may include an HF unit 334 and an MF unit 336 which are physically separated in different enclosures but coupled by cables that convey the HF baseband signal 338 and the MF baseband signal 340. The cables may also convey an HF to MF control logic signal 342 and an MF to HF control logic signal 344 between the HF unit 334 and the MF unit 336. The HF unit 334 includes an HF demodulator 346, an HF modulator 348, and an HF sense controller 350. The MF unit 336 includes an MF demodulator 352, an MF modulator 354, and an MF sense controller 356. The HF sense controller 350 and the MF sense controller 356 may allow the switching of each of the HF unit 334 and the MF unit 336 from transmit to receive modes utilizing either Continuous Tone-Coded Squelch System (CTCSS) tones or a thresholded value of some property of the HF baseband signal 338 and/or the MF baseband signal 340.

In implementations of radio frequency repeaters 332 utilizing CTCSS tones, an HF demodulator sense signal 358 and MF demodulator sense signal 360 may be sent from the HF demodulator 346 and the MF demodulator 352, respectively, when a CTCSS tone is detected that indicates that a transmission directed to the radio frequency repeater 332 has been received. In these implementations, HF sense controller 350 and MF sense controller 356 may switch the HF unit 334 and the MF unit 336 from transmit to receive modes by enabling and disabling their respective modulators and demodulators in response to receiving the HF demodulator sense signal 358 or MF demodulator sense signal 360, respectively.

In implementations of radio frequency repeaters 332 utilizing a thresholded value of a property of the HF baseband signal 338 and/or the MF baseband signal 340, the MF modulator 354 and the HF modulator 348 may detect the particular property and send a MF modulator sense signal 362 or an HF modulator sense signal 364 to the HF sense controller 350 and the MF sense controller 356, respectively. The property may be the baseband signal amplitude in particular implementations, and the MF modulator sense signal 362 and the HF modulator sense signal 364 may be transmitted when the baseband signal amplitude (or other property) rises above a predetermined or calculated threshold value. Because the MF modulator 354 may use thresholding of the HF baseband signal 338, the HF to MF control signal 344 may not actually be physically sent, but may be considered to be sent by proxy when an HF baseband signal 338 with a property of a sufficient magnitude is detected by the MF modulator 354. Once detected the MF modulator 354 may be adapted to initiate the process of sending the various control logic and sense signals required to switch the MF unit 336 from transmit to receive mode.

In various implementations of radio frequency repeaters 332, additional control signals may be included to handle various operations required during the transmit/receive switching. As illustrated in FIG. 15, these control signals may include an MF demodulator control signal 366, an MF modulator control signal 368, and HF demodulator control signal 370, and an HF modulator control signal 372. These control signals may enable the governance of all the components required to change the repeater mode from listen, up-convert, and down-convert modes. Example of components that may be controlled using control signals includes, by non-limiting example, power amplifiers, signal paths, and other radio and circuit components.

In both implementations of radio frequency repeaters 332 utilizing either CTCSS tones or thresholded values of properties of the baseband signals, when an MF demodulator sense signal 360 is received by the MF sense controller 356, an MF to HF control logic signal 342 may be sent to the HF sense controller 350. In this document, the distinction between sense and control signals is that sense signals bring sensed information into a controller while control signals carry information from the controller. In response to the MF to HF control logic signal 342, the HF sense controller 350 may switch the HF unit 334 to transmit mode (which may occur by enabling/disabling the HF modulator 348 and/or the HF demodulator 346). As another example, when an HF modulator sense signal 364 is received by the HF sense controller 350, an HF to MF control logic signal 344 may be sent to the MF sense controller 356. In response, the MF sense controller 356 may switch the MF unit 336 to transmit mode. These examples illustrate only two of the potential operations that can be used in implementations of radio frequency repeaters 332 to permit switching of the MF unit 336 and the HF unit 334 from receive to transmit mode and vice versa. Many other implementations are possible. Particular implementations of radio frequency repeaters 332 may not include the MF to HF control logic signal 342 or the HF to MF control logic signal 344, or any or all of the other control or sense signals previously described.

Implementations of MF units 336 and HF units 334 may also have the various components that make up the units physically separated into different enclosures. For example, the MF modulator 354 may be included in the second enclosure and the remaining portions of the MF unit 336 (including the MF demodulator 352) may be included in a third enclosure. The various portions of the MF unit 336 (or HF unit 334) may be coupled through one or more cables or may be coupled with MF antenna or HF antenna pairings that allow the various separated components to communicate with each other.

Figure 16:
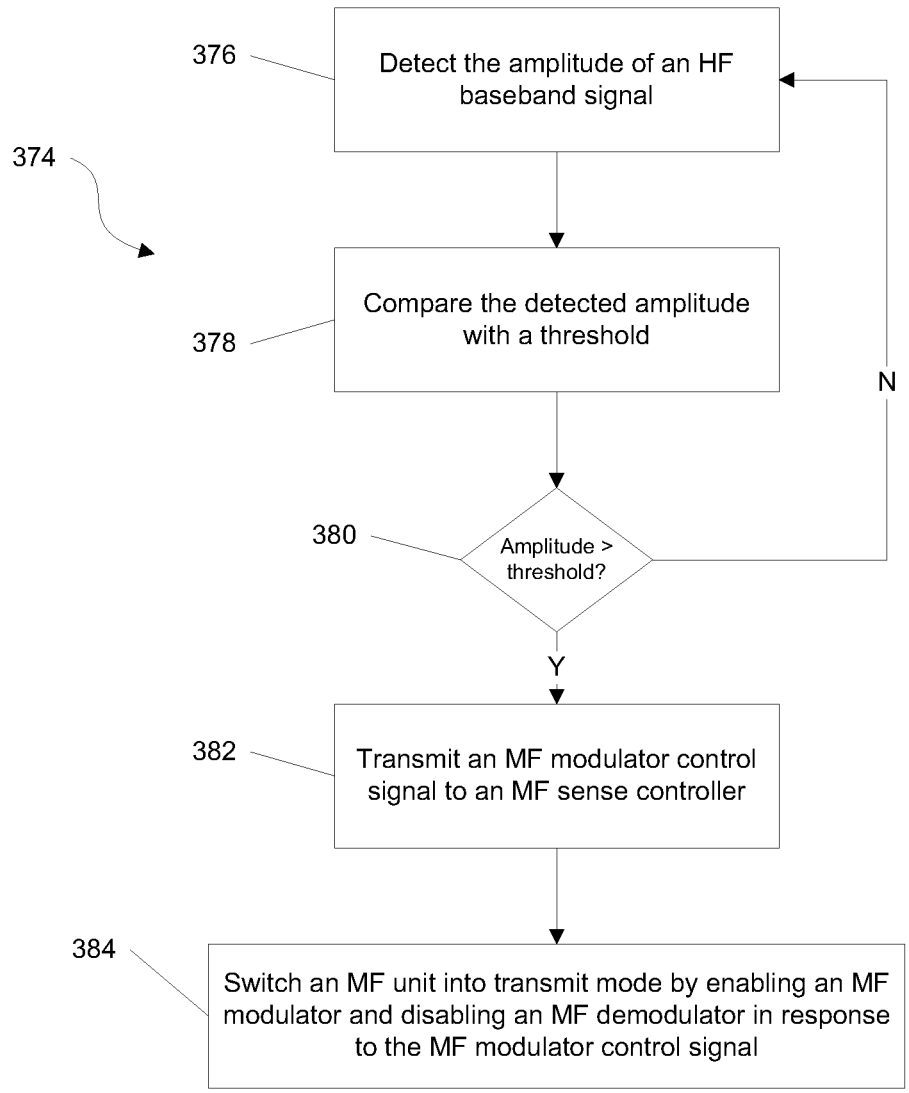
FIG. 16 is a block diagram of an implementation of a method of switching an MF unit and an HF unit from a transmit mode to a receive mode.

Referring to FIG. 16, implementations of radio frequency repeaters 294, 332 may utilize various implementations of a method of switching the MF unit and HF unit from transmit to receive mode 374. As illustrated, an implementation of the method for switching an MF unit from receive to transmit includes detecting the amplitude of an HF baseband signal (step 376), comparing the detected amplitude with a threshold (step 378), and determining whether the detected amplitude is greater than the threshold (step 380). If the detected amplitude is greater than the threshold, the method includes transmitting an MF modulator control signal to an MF sense controller (step 382) and switching the MF unit into transmit mode by enabling an MF modulator and disabling an MF demodulator in response to the MF modulator control signal (step 384). If the detected amplitude is not greater than the threshold, then the method loops back to the detection step 376. The same method steps will apply when the HF unit is switched from receive to transmit mode, and the reverse steps involving corresponding signals would be used to switch the MF unit from the transmit mode to the receive mode. The threshold utilized in implementations of the method may be either predetermined or calculated based upon a property of the signal, such as a percentage of the noise level.

Implementations of the method may further include sending an MF to HF control logic signal using the MF sense controller to an HF sense controller in response to receiving an MF demodulator sense signal with the MF sense controller to switch the HF unit into transmit mode by enabling an HF modulator and disability an HF demodulator in response to the MF to HF control logic signal. Sending the MF to HF control logic signal may further include sending the MF to HF control logic signal in response to receiving a CTCSS signal with the MF sense controller and sending a push to talk signal for the HF unit using the MF sense controller. When the push to talk signal is also sent, a standard HF radio may be able to be connected to an MF radio through a cable and act as a fully functional HF unit without requiring modifications to the standard HF radio to respond to specialized control signals from the MF sense controller. The HF radio need only respond to a push to talk signal, which it is already programmed to respond to.

Because of the ability of the HF components and MF components of implementations of radio frequency repeaters 294, 332 to be housed in separate enclosures, implementations of the repeaters may also include modular systems where each of the separate HF and MF units function as a complete HF or MF radio. Such modular radio frequency repeater systems may create smaller and more functional radio units which permit being optionally joined with a corresponding HF or MF unit to form a repeater. In such implementations, referring to FIG. 15 for the exemplary purposes of this disclosure, the HF unit 334 and the HF antenna 386 may be a HF two-way voice radio and antenna. In such implementations, the MF baseband signal 340 may be sent to the microphone input of the HF two-way voice radio. Furthermore, the HF baseband signal 338 may be the speaker output of the HF two-way voice radio. The MF baseband signal 340 and the HF baseband signal 338 may be acoustically or electrically coupled in various ways in particular implementations. Furthermore, the HF control logic signal 344 may actuate the push-to-talk control on the HF two-way voice radio.

In places where the description above refers to particular implementations of radio communication systems, enclosed space communication systems, and various related methods, it should be readily apparent that a number of modifications may be made without departing from the spirit thereof and that these implementations may be applied to other radio communication systems, enclosed space communication systems, and various related methods.

The invention claimed is:

1. A system for communicating voice or data information in an enclosed space, the system comprising:
   a high-frequency (HF) conversion side comprising an HF modulator and an HF demodulator and coupled with an HF antenna; and
   a medium-frequency (MF) conversion side comprising an MF modulator and an MF demodulator and coupled with an MF antenna;
   wherein the HF conversion side is coupled to the MF conversion side at the HF demodulator and the HF modulator;
   wherein the HF conversion side is adapted to receive a first HF signal from the HF antenna and produce a first baseband signal and to receive a second baseband signal from the MF conversion side and produce a second HF signal;
   wherein the MF conversion side is adapted to receive the first baseband signal and produce a first MF signal and to receive a second MF signal from the MF antenna and produce the second baseband signal; and
   wherein the HF conversion side is physically separate from the MF conversion side.

2. The system of claim 1, wherein the HF conversion side is coupled to the MF conversion side through one or more cables.

3. The system of claim 1, wherein the HF conversion side is acoustically coupled to the MF conversion side.

4. The system of claim 3, wherein the HF conversion side is included in an HF radio included in an enclosure, and a push-to-talk button on the HF radio is pressed by an actuator within the enclosure in response to an HF control logic signal received by the HF side from the MF conversion side.

5. The system of claim 1, wherein the HF conversion side and the MF conversion side are included in a single enclosure.

6. The system of claim 1, wherein the HF conversion side is included in a first enclosure and the MF conversion side is included in a second enclosure.

7. The system of claim 1, wherein the MF modulator and the MF demodulator are physically separate and included in an MF modulator enclosure and in an MF demodulator enclosure, respectively.

8. The system of claim 7, wherein the MF modulator and the MF demodulator are coupled through a cable.

9. The system of claim 7, wherein the MF modulator and the MF demodulator are coupled through a first MF antenna coupled to the MF modulator and through a second MF antenna coupled to the MF demodulator.

10. A system for communicating voice or data information in an enclosed space, the system comprising:

a high-frequency (HF) unit comprising an HF modulator, an HF demodulator, and an HF sense controller, the HF unit coupled with an HF antenna; and a medium-frequency (MF) unit comprising an MF modulator, an MF demodulator, and an MF sense controller, the MF unit coupled with an MF antenna;

wherein the HF unit is coupled to the MF unit at the HF demodulator, the HF modulator, and the HF sense controller; and wherein the HF unit is comprised in a first enclosure and the MF unit is comprised in a second enclosure physically separated from the first enclosure and coupled with the MF unit through one or more cables; and wherein the HF unit is adapted to switch from a receive mode to a transmit mode in response to an MF to HF control logic signal and wherein the MF unit is adapted to switch from a receive mode to a transmit mode in response to an HF to MF control logic signal.

11. The system of claim 10, wherein the HF to MF control logic signal is sent by proxy when an HF baseband signal with an amplitude above a predetermined threshold is detected by the MF modulator.

12. The system of claim 10, wherein the HF to MF control logic signal and the MF to HF control logic signal are sent in response to receiving a continuous tone-coded squelch system (CTCSS) tone.

13. A system for communicating voice or data in information in an enclosed space, the system comprising:

a high-frequency (HF) unit comprising an HF modulator, an HF demodulator, and an HF sense controller, the HF unit coupled with an HF antenna; and a medium-frequency (MF) unit comprising an MF modulator, an MF demodulator, and an MF sense controller, the MF unit coupled with an MF antenna;

wherein the HF unit is coupled to the MF conversion side at the HF demodulator, the HF modulator, and the HF sense controller; and wherein the HF unit is comprised in a first enclosure and the MF unit is comprised in a second enclosure physically separated from the first enclosure and coupled with the MF unit through one or more cables;

wherein the MF modulator and the MF demodulator are physically separate and the MF modulator is included in the second enclosure and the MF demodulator is included in a third enclosure; and wherein the MF modulator and the MF demodulator are coupled through a first MF antenna coupled to the MF modulator and through a second MF antenna coupled to the MF demodulator.

\* \* \* \* \*